(12) United States Patent
Kemnitz

(10) Patent No.: US 10,301,476 B2
(45) Date of Patent: *May 28, 2019

(54) CALCIUM FLUORIDE SOL AND OPTICALLY ACTIVE SURFACE COATINGS DERIVED THEREOF

(71) Applicant: NANOFLUOR GMBH, Berlin (DE)

(72) Inventor: Erhard Kemnitz, Berlin (DE)

(73) Assignee: NANOFLUOR GMBH, Berlin (DE)

( * ) Notice: Subject to any disclaimer, the term of this patent is extended or adjusted under 35 U.S.C. 154(b) by 854 days.

This patent is subject to a terminal disclaimer.

(21) Appl. No.: 14/410,081

(22) PCT Filed: Jun. 21, 2013

(86) PCT No.: PCT/EP2013/063084
§ 371 (c)(1),
(2) Date: Dec. 21, 2014

(87) PCT Pub. No.: WO2013/190139
PCT Pub. Date: Dec. 27, 2013

(65) Prior Publication Data
US 2015/0322269 A1    Nov. 12, 2015

(30) Foreign Application Priority Data

Jun. 21, 2012    (EP) .................................... 12173058

(51) Int. Cl.
| | | |
|---|---|---|
| C01F 11/00 | (2006.01) |
| C09D 1/00 | (2006.01) |
| C08K 5/5415 | (2006.01) |
| C08K 5/56 | (2006.01) |
| C08K 3/16 | (2006.01) |
| C08K 3/34 | (2006.01) |
| C03C 1/00 | (2006.01) |
| C01F 11/22 | (2006.01) |
| C03C 17/22 | (2006.01) |
| C23C 18/12 | (2006.01) |
| G02B 1/113 | (2015.01) |

(Continued)

(52) U.S. Cl.
CPC ............... *C09D 1/00* (2013.01); *C01F 11/22* (2013.01); *C03C 1/008* (2013.01); *C03C 17/22* (2013.01); *C08J 7/06* (2013.01); *C08K 3/16* (2013.01); *C08K 3/34* (2013.01); *C08K 5/5415* (2013.01); *C08K 5/56* (2013.01); *C09D 7/61* (2018.01); *C23C 18/1204* (2013.01); *C23C 18/127* (2013.01); *C23C 18/1254* (2013.01); *C23C 18/1283* (2013.01); *G02B 1/113* (2013.01); *C01P 2002/86* (2013.01); *C01P 2004/03* (2013.01); *C03C 2217/285* (2013.01); *C03C 2217/732* (2013.01); *C03C 2218/113* (2013.01); *C08K 2003/162* (2013.01); *C08K 2003/164* (2013.01); *G02B 2207/109* (2013.01)

(58) Field of Classification Search
CPC ..... C09D 1/00; C09D 7/61; C08J 7/06; C08K 5/5415; C08K 3/16; C08K 3/34; C08K 5/56; C08K 2003/162; C08K 2003/164; C23C 18/127; C23C 18/1204; C23C 18/1283; C23C 18/1254; C03C 1/008; C03C 17/22; C03C 2218/113; C03C 2217/732; C03C 2217/285; C01F 11/22; C01F 11/00; G02B 1/113; G02B 2207/109; C01P 2002/86; C01P 2004/03
USPC .................................................. 423/490, 497
See application file for complete search history.

(56) References Cited

U.S. PATENT DOCUMENTS 6,880,602 B2    4/2005  Evangelista
9,605,160 B2 *  3/2017  Kemnitz ................ B82Y 30/00
(Continued)

FOREIGN PATENT DOCUMENTS

| DE | 102007058927 | 10/2009 |
| EP | 1315005 | 5/2003 |
| EP | 1586542 | 10/2005 |
| EP | 1791002 | 5/2007 |
| EP | 2 253 590 | 11/2010 |
| EP | 2 708 510 | 3/2014 |
| WO | 2011/116980 | 9/2011 |

OTHER PUBLICATIONS

Noack et al. "Metal fluoride materials with complex pore structure and organic functionality,"J. Mater. Chem., 2011, 21, 334-338 (Published on Nov. 15, 2010).*
Rudiger et al: "Non-aqueous sol-gel synthesis of nano-structured metal fluorides", Journal of Fluorine Chemistry, Elsevier, NL, vol. 128, No. 4, Mar. 23, 2007 (Mar. 23, 2007), pp. 353-368.
Thomas I M: "Porous Fluoride Anti Reflective Coatings", Applied Optics Optical Society of America, Washington, DC; US, vol. 27, No. 16, Aug. 15, 1988 (Aug. 15, 1988), pp. 3356-3358.

*Primary Examiner* — Michael A Salvitti
(74) *Attorney, Agent, or Firm* — JMB Davis Ben-David

(57) ABSTRACT

The invention relates to a method for obtaining a calcium fluoride ($CaF_2$) sol solution, comprising the steps of providing a calcium precursor in a first volume in a non-aqueous solvent, and adding, in a second volume, 1.85 to 2.05 molar equivalents of anhydrous hydrogen fluoride ($n_{HF}$) per mole calcium precursor to said first volume, and/or a magnesium additive is added before or after said fluorination with hydrogen fluoride with additional 1.85 to 2.05 molar equivalents of anhydrous hydrogen fluoride ($n_{HF}$) per mole magnesium additive. Additionally or alternatively at least one metal additive precursor is added before or after the fluorination with hydrogen fluoride wherein an additional amount of hydrogen fluoride ($n_{adHF}$) is present in the fluorination step. The invention further relates to sol solutions, method of applying the sol solutions of the invention to surfaces as a coating, and to antireflective coatings obtained thereby.

20 Claims, 5 Drawing Sheets

(51) Int. Cl.
*C08J 7/06* (2006.01)
*C09D 7/61* (2018.01)

(56) References Cited

U.S. PATENT DOCUMENTS

| | | | |
|---|---|---|---|
| 2002/0191168 A1 | 12/2002 | Ishizawa | |
| 2011/0003143 A1* | 1/2011 | Sugimoto | B82Y 30/00 |
| | | | 428/330 |
| 2011/0122497 A1 | 5/2011 | Ishizawa | |
| 2015/0232670 A1* | 8/2015 | Kemnitz | B82Y 30/00 |
| | | | 428/312.8 |
| 2015/0322269 A1* | 11/2015 | Kemnitz | C09D 7/61 |
| | | | 427/372.2 |

* cited by examiner

CALCIUM FLUORIDE SOL AND OPTICALLY ACTIVE SURFACE COATINGS DERIVED THEREOF

CROSS-REFERENCE TO RELATED APPLICATIONS

This is the U.S. National Stage of International Application No. PCT/EP2013/063084, filed Jun. 21, 2013, which was published in English under PCT Article 21(2), which in turn claims the benefit of EP Patent Application No. 12173058.4, filed Jun. 21, 2012.

The present invention relates to $CaF_2$ sols, processes for their synthesis and methods for manufacturing optically active surface coatings comprising $CaF_2$ as optically active component. The invention also encompasses solar panels, architectural glass, optical systems and lenses or polymer surfaces coated by the surface coatings of the invention.

The reflection of visible light passing through an optically transparent substrate (e.g., glass) can be reduced by coating the substrate with an optical active thin layer exhibiting a refractive index laying between the refractive index of the substrate ($n_S$~1.5 in case of glass) and that of air ($n_{air}$=1).

Multi-layer systems (interference layers, usually alternating layers of high reflective $TiO_2$- and low reflective $SiO_2$- films) are known in the art. They suffer from high production costs and complex methods of manufacture. An ideal single layer coating material would have a refractive index around $n_c$~1.23, resulting in a nearly 100% optically transparent system (see FIG. 1).

Anti-reflective (AR) oxide monolayers are known in the art. However, since the oxide material with the lowest refractive index is $SiO_2$ ($n_{SiO2}$~1.46), porosity has to be introduced into such layers as described by DE 10 2007 058927 A1. However, up to more than 50% porosity is needed to get porous layers with n=1.23, resulting in low mechanic stability of such layers.

Some metal fluorides exhibit refractive indexes significantly lower than $SiO_2$. Magnesium fluoride is the most investigated material ($n_{MgF2}$=1.38). Calcium fluoride has a slightly higher refractive index ($n_{CaF2}$=1.40). Its lower solubility in water ($L_{MgF2}$=130 mg/l; $L_{CaF2}$=16 mg/l) renders $CaF_2$ layers significantly more robust against moisture impact.

Other properties such as scratch resistance, mechanic stability, thermal stability and hydrolysis resistance are important for applications such as coatings of glass or polymers.

Vapor phase deposition methods such as sputtering can be employed for film deposition. Thin layers obtained thereby do usually not show significant porosity, resulting in a refractive index of close to or corresponding to that of the bulk material. Vapor phase deposited $MgF_2$-layers suffer from non-stoichiometric adjustment of metal to fluorine ratios, leading to point defects ("F-center") formation, resulting in impaired optical quality of the layer. Evaporation methods may aid in overcoming this problem, however large area depositions are not facilitated thereby because of point defect formation. The introduction of necessary porosity is insufficient in both methods. Liquid phase deposition methods based on e.g. $SiO_2$-sols are suitable for introducing porosity into the layers.

U.S. Pat. No. 6,880,602B2 (EP 1 315 005 B1) show a process for obtaining sol solutions of magnesium fluoride by reacting magnesium acetate or methoxide with aqueous hydrofluoric acid in methanol at elevated temperatures under high pressure. This process suffers from significant disadvantages when applied in technical scale, such as the need for high pressure batch reactions and the use of methanol, which is toxic.

WO 2011/116980 A1 and US 2011/0122497 A1 (EP 1 791 002 A1) show $MgF_2$-sols obtained by a high pressure process, with added $SiO_2$-sols as "binders", which results in acceptable optical and mechanical characteristics of the layers.

Metal fluoride layers generated from liquid phase deposition were described first based on metal trifluoroacetate sols (S. Fujihara, in *Handbook of Sol-Gel Science and Technology*, ed. S. Sakka, Kluwer, Boston, 2005, vol. 1, pp. 203-224). In a first step, the metal fluoride trifluoroactetates are deposited onto the substrate and are subsequently decomposed thermally, resulting in very porous metal fluoride layers. Due to the formation of hydrogen fluoride during this thermal decomposition process and a drastic shrinking of the layer thickness, an adjustment of the parameters of such layers is difficult. Moreover, the coated substrate as well as the equipment can undergo corrosion caused by evaporated hydrogen fluoride gas. Insufficient mechanical performance of the resulting layer is a further drawback of this technology.

The present invention aims at the preparation of low refractive index antireflective layers that overcome the drawbacks of the state of the art. This problem is solved by the methods, preparations and coatings as described by the independent claims.

According to a first aspect of the invention, a method for obtaining a calcium fluoride ($CaF_2$) sol solution is provided, comprising the steps of
a) providing calcium in a first volume, in a non-aqueous solvent, in the form of a calcium precursor,
b) adding, in a second volume, 1.85 to 2.05 molar equivalents of anhydrous hydrogen fluoride (HF) per mole calcium precursor to said first volume, and
c) adding, a metal additive before, during or after step b), wherein said metal additive is selected from
 i) magnesium, in the form of a magnesium precursor, wherein
  the amount of magnesium, in relation to the amount of calcium, is selected from 1:100 to 1:1 as measured in molar equivalent of magnesium to calcium, and wherein
  1.85 to 2.05 molar equivalents of anhydrous hydrogen fluoride ($n_{HFc}$) per mole magnesium are present in said second volume, in addition to the HF present in said second volume per mole calcium, and/or
 ii) a metal additive, selected from the group comprising lithium, calcium, antimony, tin, strontium, barium, aluminium, silicium, zirconium, titanium or zinc, in the form of a metal additive precursor, wherein
  the amount of said metal additive precursor, in relation to the sum of the amount of calcium and magnesium, is selected from 1:100 to 1:5, as measured in molar equivalents of said metal additive to the sum of calcium and magnesium, and wherein
  an additional amount of hydrogen fluoride ($n_{adHF}$) is present in step b computed according to the formula $n_{adHF}^{MgCa} = (n_M * \chi_{additive}) * Ox * A$, wherein $n_M$ is sum of the molar amounts of calcium and magnesium, $\chi_{additive}$ is the molar percentage of said metal additive in relation to $n_M$, $\chi_{additive}$ is in the range of 1% to 20%, Ox is the number characterizing the oxidation state of said metal additive, and A is selected from $0 \leq A \leq 1$.

In other words, the sol solution comprises at least calcium and at least one additional metal component, wherein the additional metal component can be magnesium, lithium, antimony, tin, strontium, barium, aluminium, silicium, zirconium, titanium or zinc. Magnesium may be present in an amount up to 50% of the total metal content of the solution.

Said metal additive is added also in a non-aqueous solvent.

In some embodiments, the method for obtaining a calcium fluoride (CaF$_2$) sol solution comprises the steps of
a. providing a calcium precursor in a non-aqueous solvent in a first volume and
b. adding, in a second volume, two molar equivalents of anhydrous hydrogen fluoride (HF) to said calcium precursor.

In some embodiments, the method for obtaining a calcium fluoride (CaF$_2$) sol solution comprises the steps of
a. providing a calcium precursor in a non-aqueous solvent in a first volume and
b. adding, in a second volume, two molar equivalents of anhydrous hydrogen fluoride (HF) to said calcium precursor and
c. adding a magnesium additive, wherein
the amount of said magnesium additive, in relation to the amount of said calcium precursor is 1:100 to 1:1, as measured in molar equivalent of said magnesium additive to said calcium precursor, and wherein
additionally 1.85 to 2.05 molar equivalents of anhydrous hydrogen fluoride ($n_{HFc}$) per mole magnesium additive is present in said second volume.

In some embodiments, the method for obtaining a calcium fluoride (CaF$_2$) sol solution comprises the steps of
a. providing a calcium precursor in a first volume in a non-aqueous solvent, and
b. adding, in a second volume, 1.85 to 2.05 molar equivalents of anhydrous hydrogen fluoride (HF) per mole calcium precursor to said first volume, and
c. a magnesium additive is added before or after said fluorination with hydrogen fluoride of step b, wherein
the amount of said magnesium additive, in relation to the amount of said calcium precursor is 1:100 to 1:1, as measured in molar equivalent of said magnesium additive to said calcium precursor, and wherein
additionally 1.85 to 2.05 molar equivalents of anhydrous hydrogen fluoride (NO per mole magnesium additive is present in said second volume, and
d. at least one metal additive precursor is added before or after the fluorination with hydrogen fluoride of step b, whereby the amount of said metal additive precursor, in relation to the amount of said calcium precursor or, in case of executing step c, in relation to the sum of the amount of said calcium precursor and said magnesium additive, is 1:100 to 1:5, as measured in molar equivalent of said metal additive to said calcium precursor or, in case of executing step c, of said metal additive to the sum of said calcium precursor and said magnesium additive, wherein
an additional amount of hydrogen fluoride ($n_{adHF}$) is present in the fluorination of step b computed according to the formula $$n_{adHF}^{Ca} = (n_M * \chi_{additive}) * Ox * A, \text{ wherein}$$

$n_M$ is the molar amount of said calcium precursor or, in case of executing step c, the molar amount of said calcium precursor and said magnesium additive, $\chi_{additive}$ is the molar percentage of said metal additive precursor in relation to said molar amount of said calcium precursor or, in case of executing step c, the sum of said molar amount of said calcium precursor and said magnesium additive, wherein $\chi_{additive}$ is in the range of 1% to 20%, and Ox is the oxidation state of the metal of said additive precursor, and A is selected from $0 \leq A \leq 1$.

In some embodiments, the method for obtaining a calcium fluoride (CaF$_2$) sol solution comprises the steps of
a. providing a calcium precursor in a first volume in a non-aqueous solvent, and
b. adding, in a second volume, 1.85 to 2.05 molar equivalents of anhydrous hydrogen fluoride (HF) per mole calcium precursor to said first volume, and
at least one metal additive precursor is added before or after the fluorination with hydrogen fluoride of step b, whereby the amount of said metal additive precursor, in relation to the amount of said calcium precursor or, in case of executing step c, in relation to the sum of the amount of said calcium precursor and said magnesium additive, is 1:100 to 1:5, as measured in molar equivalent of said metal additive to said calcium precursor or, in case of executing step c, of said metal additive to the sum of said calcium precursor and said magnesium additive, wherein
an additional amount of hydrogen fluoride ($n_{adHF}$) is present in the fluorination of step b computed according to the formula $$n_{adHF} = (n_M * \chi_{additive}) * Ox * A, \text{ wherein}$$

$n_M$ is the molar amount of said calcium precursor or, in case of executing step c, the molar amount of said calcium precursor and said magnesium additive, $\chi_{additive}$ is the molar percentage of said metal additive precursor in relation to said molar amount of said calcium precursor or, in case of executing step c, the sum of said molar amount of said calcium precursor and said magnesium additive, wherein $\chi_{additive}$ is in the range of 1% to 20%, and Ox is the oxidation state of the metal of said additive precursor, and A is selected from $0 \leq A \leq 1$.

In an alternative of this first aspect of the invention, a method for obtaining a calcium fluoride (CaF$_2$) sol solution is provided that comprises the steps of
a) providing calcium in a first volume, in a non-aqueous solvent, in the form of a calcium precursor, and simply adding, in a second volume, 1.85 to 1.95 molar equivalents of anhydrous hydrogen fluoride (HF) per mole calcium precursor to said first volume.

In other words, the advantages of the sol solutions of the present invention, namely their ability to form stable sol solutions with extraordinarily hard and resistant antireflective coatings, can also be achieved by making a calcium fluoride sol solution without additive metals, but using a slight dearth or deficit of HF. This dearth or deficit leads to calcium species being present in the final coating after application of the resulting solution, and subsequent thermal processing, that has qualities comparable to those achievable by additive particles.

The CaF$_2$ sols of the invention are synthesized by reacting a solution of a suitable calcium salt precursor, such as—by way of non-limiting example—an alcoholate, carboxylate, carbonate, (hydr)oxide, chloride or nitrate, in organic water-free solvents like alcohols, polyalcohols, ethers, esters, and mixtures thereof with anhydrous hydrogen fluoride (HF). The HF is provided in gaseous or in liquid form or as solution in a solvent as aforementioned. Alternatively a magnesium additive and/or a metal additive may be present.

The method according to the invention differs from methods known in the art by carefully controlling the water content of the reaction volume (i.e., the water content of educt and its solvent, the water content of the HF added, and the amount of water resulting from the reaction and further reactions downstream, for example, from a reaction between the calcium precursor ligand and the solvent.

In some embodiments, step b. is performed under vigorous stirring. In some embodiments, the stirring speed exceeds 100 rpm, 150 rpm, 200 rpm, 250 rpm or 300 rpm. In some embodiments, the stirring speed is in the range of 100 rpm to 1000 rpm, in particular 600 rpm to 1000 rpm. In some embodiments, the stirring speed exceeds 100 rpm, 200 rpm, 300 rpm, 400 rpm, 500 rpm, 600 rpm, 700 rpm, 800 rpm, 900 rpm or 1000 rpm, in particular the stirring speed exceeds 600 rpm, 700 rpm, 800 rpm, 900 rpm or 1000 rpm.

In some embodiments, the reaction volume resulting from the second volume being added to the first volume is stirred for 2 to 10 days, in particular for 2, 3, 4, 5, 6, 7, 8, 9 or 10 days. In some embodiments, the reaction volume resulting from the second volume being added to the first volume is stirred for 8 to 20 hours, in particular for 8, 12, 16 or 20 hours or 1 to 21 days, in particular for 1, 2, 3, 4, 5, 6, 7, 8, 9, 10, 11, 12, 13, 14, 15, 16, 17, 18, 19, 20, 21 days. The stirring time depends on the used reactants and conditions, whereby the stirring will be stopped after a clear sol solution is achieved. In some embodiments, clear sols are obtained if additives (Li$^+$, Mg$^{2+}$, Sr$^{2+}$, Ca$^{2+}$, Ba$^{2+}$, Sn$^{2+}$, Zn$^{2+}$, Al$^{3+}$, Si$^{4+}$, Ti$^{4+}$, Zr$^{4+}$, Sn$^{4+}$, Sb$^{3+}$ or Sb$^{5+}$ compounds) are added. Addition of Zn$^{2+}$, Al$^{3+}$, Si$^{4+}$, Ti$^{4+}$, Zr$^{4+}$, Sn$^{4+}$, Sb$^{3+}$ or Sb$^{5+}$ compounds results in clear sols after around 3 to 5 days, for the other additives it takes around 5 to 7 days. In case of calcium lactate as precursor, the time until clear sols are formed takes in general 3 to 5 days longer. Additives causing the fastest clearing off time are in the order Al>Ti>Zr>Sn>Zn, Li.

In some embodiments, the calcium precursor will be a calcium carboxylate, for example calcium acetate or calcium lactate, a calcium alcoholate, in particular a calcium ethoxide, or a calcium chloride or calcium nitrate and the reaction solvent will be an alcohol such as ethanol or methanol. Therein, the water content of the final sol solution will be governed by the water content of the solvent, the water content of the calcium precursor such as calcium chloride, calcium, calcium nitrate, calcium ethoxide, calcium acetate or lactate and the water content of the HF solution (if a solution is used, as will be practical in order to adjust the amount of HF to an exact stoichiometric equivalent).

In addition, for such embodiments where the solvent is an alcohol and the calcium ligand is a carboxylate, water formed by esterification of the carboxylic acid formed in the reaction between calcium carboxylate and HF, with the solvent needs to be accounted for. Such accounting needs to take place to the degree that water is actually formed, i.e. by determining the amount of esterification, which may be different for different solvent-acid combinations. Moreover, the esterification product may well have an influence on the stability of the resulting sol solution. It has been found, for example, that addition of acetic acid ethyl ester to a sol solution formed by reaction of calcium acetate in ethanol does not influence the stability of the sol. However, water as by-product of esterification can destabilize the sol. Water in general tends to perturb sol formation and favours gelling. When comparing the method of the present invention with sol formation protocols employing other carboxylic acids (particularly the known acetate routes, which, for example, use aqueous hydrofluoric acid), the use of acetate and lactate according to the method of the invention offers unexpected advantages with respect to ease of formation and stability of the resulting sol solutions.

The use of dry calcium carboxylates, in particular calcium acetate and calcium lactate, in a water free solution of HF reduces the water content of the reaction and thus, the above mentioned negative effects of water are reduced significantly. The only unavoidable source of water according to the method of the invention is the amount of water which is formed by the eventual esterification, if any. Thus, a reduced amount of water may be present during the reaction and the unwanted negative effects of said water are reduced. The same applies to other calcium precursor compounds.

The method according to the invention does not rely on complete absence of water. The solvents used for preparing the first and second volume (in embodiments where HF is applied in solution) of the reaction do not have to be dried. In practice, the use of "absolute" solvents as supplied technically, having a water content of equal to or smaller than 0.2% (w/w) has been sufficient. Calcium precursor compounds such as calcium acetate or calcium lactate were used in dried form, having a water content of 0.3 to 0.5 moles per mole calcium.

In some embodiments, the water content of the sol solution is in the range of 2.8 to 0.1 mole water per mole calcium. In some embodiments, the water content of the sol solution is equal to or lower than 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2 or 0.1, mole water per mole calcium. In some embodiments, the water content of the sol solution is equal to or lower than 0 and 1.5 mole water per mole calcium One important parameter of the method according to the invention is the amount of HF being applied, the ideal amount being an exact stoichiometric equivalent (2 HF per Ca). Smaller amounts of HF will improve sol formation, however will lead to impaired mechanical and optical properties of the resulting coating. Larger amounts of HF lead to less stable sols or difficulties in sol formation. In general, amounts of HF exceeding 2 molar equivalents tend to favour crystalline rather than nanodisperse phases, leading to larger particle sizes and, eventually, precipitation.

Another ideal amount of HF, in case the used calcium precursor and/or magnesium additive and/or the metal additive comprise chloride, is less than an exact stoichiometric equivalent per calcium precursor or per calcium precursor and magnesium additive, as discussed above, in particular an amount of 1.6 to 1.95 eq HF, further in particular an amount of 1.85 to 1.95 eq HF is used. In some embodiments, the exact stoichiometric amount is reduced by the amount of up to ⅓ of the molar equivalent of the overall chloride ($c_{Cl}$) amount in the sol reaction mixture (⅓*$n_{Cl}$). Such a reduced amount is used, in particular, if the used magnesium additives and/or metal additives comprise chloride. The smaller amount of HF will, in this case, improve sol formation and lead to enhanced mechanical properties without affecting the optical properties of the resulting coating. The inventors believe, without being bound by this theory, that this is due to the formation of "CaClF" particles (see discussion).

In some embodiments, the amount of HF employed ranges from 1.8 mole to 2.2 mole HF per mole Ca. In some embodiments, the amount of HF employed ranges from 1.9 mole to 2.1 mole HF per mole Ca. In some embodiments, the amount of HF employed ranges from 1.95 mole to 2.05 mole HF per mole Ca. In some embodiments, the amount of HF employed ranges from 1.98 mole to 2.02 mole HF per mole Ca. In some embodiments, the amount of HF employed ranges from 1.99 mole to 2.01 mole HF per mole Ca. In some embodiments, the amount of HF employed ranges from 1.8 mole to 1.95 mole HF, particularly 1.85 mole to 1.95 mole HF, per mole Ca. In some embodiments, the amount of HF employed ranges from 1.85 mole to 2.05 mole HF. The same ranges of the amount of HF employed (per mole magnesium) apply for a magnesium additive, if a magnesium additive is used (see discussion below).

The precursor compound from which calcium fluoride is formed can be selected from a broad range of calcium salts; the main requirement being that a sol solution can be formed from the precursor in the solvent used within a reasonable amount of time. For embodiments, which aim at providing sol solutions for optical surface coatings, the acid (in the following abbreviated by the term: "BH") formed by the principal $CaF_2$ formation reaction

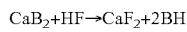

$$CaB_2 + HF \rightarrow CaF_2 + 2BH$$

must be removed from the coating in order not to degrade its optical properties. The removal of the acid is easily effected by evaporation during the drying or first thermal treatment of the coating. Hence, for embodiments of the invention where removal of the acid formed from the calcium precursors is essential, the calcium precursor is the calcium salt of an acid that is volatile at the conditions employed during drying and tempering, for example a precursor that is the salt of an acid that is volatile (has a vapour pressure allowing the removal of essentially all (>99%) of the acid from a 0.5 μm optical coating at ambient pressure) at a temperature of 30° C., 40° C., 50° C., 60° C., 70° C., 80° C., 90° C., 100° C., 125° C., 150° C., 175° C., 200° C., 225° C., 250° C., 275° C. or 300° C. In some embodiments a temperature in the range of about 100° C. to 500° C., in particular of about 250° C. to 500° C. can be used. In some embodiments a temperature in the range of about 400° C. to 500° C. can be used. In some embodiments a temperature in the range of about 100° C. to 700° C. is used.

In some embodiments, the calcium precursor is a calcium alcoholate (RO—) a calcium carboxylate (RCOO—), a calcium carbonate, calcium hydroxide, calcium chloride or calcium nitrate. In some embodiments, the calcium precursor is calcium methanolate, calcium ethanolate or calcium lactate. In some embodiments, the calcium precursor is calcium alcoholate, calcium chloride or calcium carboxylate, in particular calcium acetate or lactate. In some embodiments, the calcium precursor is calcium alcoholate, in particular calcium ethanolate, or calcium chloride.

A large number of solvents offer themselves for practicing the invention. In some embodiments, the non-aqueous solvent is an alcohol such as, by way of non-limiting example, methanol, ethanol or isopropanol. In some embodiments, the non-aqueous solvent is ethanol or isopropanol, particularly ethanol. In some embodiments, the non-aqueous solvent is a polyalcohol such as, by way of non-limiting example, (poly) ethyleneglycol. In some embodiments, the non-aqueous solvent is an ether such as, by way of non-limiting example, dietyl ether, methyl tert-butyl ether or tetrahydrofurane. In some embodiments, the non-aqueous solvent is an ester. In some embodiments, the non-aqueous solvent is a mixture of any of the previously cited solvents.

For embodiments that aim at providing technical scale quantities, the solvent needs to be available at low price, restricting the most interesting options mainly to methanol and ethanol. Since methanol is toxic, handling and operation of the sol formation itself and its downstream applications in surface coatings require additional safety measures. For such applications, embodiments of the process of the invention are preferred in which ethanol can be used as a solvent. The method according to the present invention offers the great advantage of providing sol solutions that are particularly stable in ethanol even at high concentrations. In some embodiments—using ethanol or isopropanol as a solvent—the solution has a calcium content in the range of about 0.2 mol/L to 0.8 mol/L, in particular of about 0.2 mol/L to 0.6 mol/L. In some embodiments using ethanol or isopropanol, in particular ethanol, as a solvent the solution has a calcium content in the range of about 0.2 mol/L to 0.4 mol/L. In some embodiments, the calcium content is 0.2 mol/L, 0.3 mol/L, 0.4 mol/L, 0.5 mol/L, 0.6 mol/L, 0.7 mol/L or 0.8 mol/L.

In some embodiments, the calcium precursor is calcium chloride. In some embodiments, the calcium precursor is calcium ethanolate. In one embodiment, the non-aqueous solvent is ethanol and the precursor is calcium ethanolate or calcium chloride. In some embodiments, the calcium precursor is calcium lactate. In one embodiment, the non-aqueous solvent is ethanol. In one embodiment, the non-aqueous solvent is ethanol and the precursor is calcium lactate.

In some embodiments, the calcium precursor is an alcoholate (RO—), a carboxylate (RCOO—), a carbonate, an alkoxycarbonate, a hydroxide, a nitrate or a halide (selected from chloride, bromide and iodide), in particular a halogenide, a alcoholate or a carboxylate, and further in particular a chloride or ethanolate. In some embodiments, the calcium precursor is a calcium alcoholate (RO—), a calcium carboxylate (RCOO—), calcium carbonate, calcium hydroxide, calcium chloride or calcium nitrate, particularly a calcium alcoholate or calcium chloride, further in particular calcium ethanolate and calcium chloride.

In some embodiments, the magnesium additive is an alcoholate (RO—), a carboxylate (RCOO—), a carbonate, an alkoxycarbonate, a hydroxide, a nitrate or a halide (selected from chloride, bromide and iodide), in particular a halogenide, a alcoholate or a carboxylate, and further in particular chloride or ethanolate. In some embodiments, the magnesium additive is a magnesium alcoholate (RO—), a magnesium carboxylate (RCOO—), magnesium carbonate, magnesium hydroxide, magnesium chloride or magnesium nitrate, particularly a magnesium alcoholate or magnesium chloride, further in particular magnesium ethanolate and magnesium chloride.

In some embodiments, the sol solution reaction comprises a calcium precursor comprising an alcoholate (RO—), a carboxylate (RCOO—), a carbonate, an alkoxycarbonate, a hydroxide, a nitrate or a halide (selected from chloride, bromide and iodide), in particular a halogenide, a alcoholate or a carboxylate, and further in particular chloride or ethanolate and a magnesium additive comprising an alcoholate (RO—) a carboxylate (RCOO—), carbonate, an alkoxycarbonate, hydroxide, nitrate or a halide (selected from chloride, bromide and iodide), in particular a halogenide, a alcoholate or a carboxylate, and further in particular chloride or ethanolate.

In some embodiments, the sol solution reaction comprises a calcium precursor comprising an alcoholate (RO—) or a halide (selected from chloride, bromide and iodide), in particular a chloride or ethanolate and a magnesium additive comprising an alcoholate (RO—) or a halide (selected from chloride, bromide and iodide), in particular a chloride or ethanolate, wherein further in particular at least one of the mentioned compounds comprises chloride.

The inventors have surprisingly found that addition of non-calcium metallic precursors to the sol reaction improves the optical and mechanical properties of the coating layers obtained from these sols. Thus, the addition of such a metal additive compound (referred to as "metal additive" or "additive") has a positive influence. The resulting coatings show increased amorphicity and porosity. Furthermore, the addition of metal additive results in an improved and faster clearing of the sol solution, and an improved stability of said sol solution. In some embodiments, the sol reaction is modified by including an additive precursor selected from the group comprising an alcoholate (RO—) a carboxylate (RCOO—), a carbonate, an alkoxycarbonate, a hydroxide, a nitrate or a halogenide such as chloride, bromide or iodide of lithium, magnesium, calcium, strontium, barium, aluminium, silicium, zirconium, titanium antimony, tin or zinc.

In some embodiments, the sol reaction is modified by including a magnesium additive, wherein the magnesium additive comprises an alcoholate (RO—) a carboxylate (RCOO—), a carbonate, an alkoxycarbonate, hydroxide, nitrate or a halide (selected from chloride, bromide and iodide), in particular halogenide, a alcoholate or a carboxylate, and further in particular chloride or ethanolate.

In some embodiments, the sol reaction is modified by including a metal additive compound selected from the group comprising an alcoholate (RO—) a carboxylate (RCOO—), carbonate, an alkoxycarbonate, hydroxide, nitrate or a halide (selected from chloride, bromide and iodide) of lithium, magnesium, calcium, strontium, barium, aluminium, silicium, zirconium, titanium, antimony, tin or zinc, in particular of magnesium, calcium, aluminium, silicium, zirconium or titanium, further in particular of magnesium, calcium or aluminium.

In some embodiments, the sol reaction is modified by including a magnesium additive and a metal additive independently selected from each other from the above mentioned groups.

In some embodiments, the sol reaction is modified by including a metal additive compound selected from the group comprising an alcoholate (RO—), a carboxylate (RCOO—), carbonate, an alkoxycarbonate, hydroxide, nitrate or a halide (selected from chloride, bromide and iodide) of lithium, calcium, strontium, barium, aluminium, silicium, zirconium, titanium, antimony, tin or zinc in particular of calcium, aluminium, silicium, zirconium or titanium, further in particular of calcium or aluminium.

In some embodiments, the sol reaction is modified by including a metal additive compound selected from the group comprising chloride, methanolate, ethanolate, propylate, butylate, acetate or lactate, in particular chloride or an alcoholate such as ethanolate of lithium, magnesium, calcium, strontium, barium, aluminium, silicium, zirconium, titanium, antimony, tin or zinc, in particular of magnesium, calcium, aluminium, silicium, zirconium or titanium, further in particular magnesium, calcium or aluminium.

In some embodiments, the sol reaction is modified by including a metal additive compound selected from the group comprising a chloride of lithium, magnesium, calcium, strontium, barium, aluminium, silicium, zirconium, titanium, antimony, tin or zinc, in particular a chloride of magnesium, calcium or aluminium, in particular of magnesium, calcium, aluminium, silicium, zirconium or titanium, further in particular of magnesium, calcium or aluminium.

The above mentioned metal additive compounds may be employed in a sol reaction comprising a calcium precursor or a calcium precursor and a magnesium additive, selected from the embodiments as discussed above.

In some embodiments, the sol reaction comprises a calcium precursor selected from calcium acetate, lactate or ethanolate. In some embodiments, the sol reaction comprises a calcium precursor selected from calcium chloride. In some embodiments, the sol reaction comprises a calcium precursor selected from calcium alcoholate, in particular calcium ethanolate, and an additive selected from magnesium or calcium chloride. In some embodiments, the sol reaction comprises a calcium precursor selected from calcium chloride and a magnesium alcoholate additive, in particular magnesium ethanolate.

In some embodiments, the sol reaction comprises a calcium precursor selected from calcium alcoholate, in particular calcium ethanolate, a magnesium chloride additive and a metal additive selected from aluminium alcoholate, in particular aluminium isopropylate, or aluminium chloride. In some embodiments, the sol reaction comprises a calcium precursor selected from calcium chloride, a magnesium alcoholate, in particular magnesium ethanolate, additive, and a metal additive selected from aluminium alcoholate, in particular aluminium isopropylate, or aluminium chloride. In some embodiments, the sol reaction comprises a calcium chloride alcoholate, in particular calcium ethanolate, a magnesium alcoholate, in particular magnesium ethanolate, additive, and a calcium chloride metal additive.

In some embodiments, the sol reaction comprises a calcium precursor selected from calcium alcoholate, in particular calcium ethanolate, a magnesium chloride additive and a metal additive selected from zirconium, titan or silicium alcoholate. In some embodiments, the sol reaction comprises a calcium precursor and/or a magnesium additive and/or at least one additional metal additive, wherein at least one of the before mentioned compounds comprises chloride. In some embodiments, the sol reaction comprises a calcium precursor and/or a magnesium additive and/or two or more metal additives selected from the embodiments discussed above, wherein, in particular, at least one of the before mentioned compounds comprises chloride.

An important distinction of embodiments making use of additives is the fact that the additive precursor may be added during the fluorination step, i.e. along with the calcium precursor.

In some embodiments, the metal additive precursor is present in an amount of 0.2 mole (1:5) to 0.001 mole (1:1000) per mole calcium. In some embodiments, the metal additive precursor is present in an amount of 0.1 mole (1:10) to 0.01 mole (1:100) per mole calcium. In some embodiments, the metal additive compound is present in an amount of 0.2 mole (1:5) to 0.01 mole (1:100) per mole calcium. In some embodiments, the metal additive compound is present in an amount of 0.2 mole (1:5) to 0.04 mole (1:25) per mole calcium. In some embodiments, the metal additive compound is present in an amount of 0.2 mole (1:5) to 0.08 mole (1:12.5) per mole calcium. In some embodiments, the metal additive compound is present in an amount of 0.1 mole (1:10) to 0.04 mole (1:25) per mole calcium. In some embodiments, the metal additive compound is present in an amount of 0.01 mole (1:100) to 0.04 mole (1:25) per mole calcium.

In some embodiments, a magnesium additive compound is present in an amount of 1 mole (1:1) to 0.01 mole (1:100) per mole calcium. In some embodiments, the magnesium additive is present in an amount of 0.99 mole (99:100) to 0.01 mole (1:100) per mole calcium. In some embodiments, the magnesium additive is present in an amount of 1 mole (1:1) to 0.25 mole (1:4) per mole calcium. In some embodiments, the magnesium additive is present in an amount of 1 mole (1:1) to 0.4 mole (1:2.5) per mole calcium. In some embodiments, the magnesium additive is present in an amount of 0.67 mole (1:1.5) to 0.4 mole (1:2.5) per mole calcium. In some embodiments, the magnesium additive is present in an amount of 1 mole (1:1) to more than 0.25 mole per mole calcium. In some embodiments, the magnesium additive is present in an amount of 0.4 mole (1:2.5) to more than 0.25 mole per mole calcium. In some embodiments, the magnesium additive is present in an amount of 0.99 mole (1:99) to more than 0.25 mole per mole calcium.

In some embodiments, additionally to the before mentioned magnesium additive a further metal additive compound is present in an amount of 0.2 mole (1:5) to 0.01 mole (1:100) per mole calcium and magnesium (in other words the metal additive is calculated with respect to the sum of the molar equivalents of calcium and magnesium additive). In some embodiments, the metal additive compound is present in an amount of 0.2 mole (1:5) to 0.04 mole (1:25) per mole calcium and magnesium. In some embodiments, the metal additive compound is present in an amount of 0.2 mole (1:5) to 0.08 mole (1:12.5) per mole calcium and magnesium. In some embodiments, the metal additive compound is present in an amount of 0.1 mole (1:10) to 0.04 mole (1:25) per mole calcium and magnesium. In some embodiments, the metal additive compound is present in an amount of 0.01 mole (1:100) to 0.04 mole (1:25) per mole calcium and magnesium.

The resulting additive fluoride particles are, to the extent that the inventors have been able to characterize these phases, not double salts of calcium and additive, but rather distinct species, present in the sol as a mixture of single components ($CaF_2$ and the $MF_x$ additive). In some embodiments, the additive fluoride particles have a diameter size of smaller than (<) 100 nm, <75 nm, <50 nm, <40 nm, <30 nm, <20 nm or <10 nm. Concerning other species reference is made to the discussion further below.

In some embodiments, an amount of 1%, 2%, 3%, 4%, 5%, 6%, 7%, 8% or 10% (mol equ.) of tetraethoxysilane (TEOS) is added to the calcium precursor solution or suspension, leading to more rapid sol formation than without the additive.

Addition of said additives promotes the formation of mostly amorphous nano-$CaF_2$ particles that are even smaller than those obtained without additives; thus resulting in an improved architectural ordering of the layer, and hence improved mechanical strength. Based on $^{19}$F-NMR spectra (cf. FIG. 2), characteristic patterns for the $CaF_2$ particles synthesized this way can be obtained thus allowing distinction from $CaF_2$-materials obtained according different syntheses approaches.

If metal $M^{n+}$-additives are used the HF-stoichiometry related to $Ca^{2+}$-precursors ($n_{HF}/n_{Ca2+}$) can be varied between 1.6 up to 2.2. In some embodiments, the stoichiometric ratio of HF to calcium precursor ($n_{HF}/n_{Ca2+}$) can be varied between 1.85 up to 2.05, in particular between 1.9 up to 2.05. In some embodiments, the HF stoichiometry will be fixed to exactly 2.0 in reference to the calcium content. As long as stoichiometric amounts of HF are used ($n_{HF}/n_{Ca2+}$=2) formation of the other $MF_n$ ($M^{n+}$=$Li^{1+}$, $Ca^{2+}$, $Ba^{2+}$, $Sn^{2+}$, $Zn^{2+}$, $Ti^{4+}$, $Zr^{4+}$, $Sn^{4+}$, $Sb^{3+}$, $Sb^{5+}$, $Mg^{2+}$, $Sr^{2+}$, $Al^{3+}$, and $Si^{4+}$) is suppressed as evidenced by NMR. In some embodiments, the HF stoichiometry will be fixed to exactly 2.0 in reference to the content of calcium and additive, wherein the amount of fluoride that can react with the additive is computed according to the oxidation state of the additive. Thus, for embodiments where calcium precursors and additives according to the above definition are present and an exact stoichiometric amount of 2 HF per calcium is used, only the calcium precursor will be fluorinated. The term "only the calcium precursor will be fluorinated" refers to an essentially quantitative conversion of the calcium precursor. It is possible that in some embodiments, traces of the calcium precursor will not be fluorinated and traces of the additive can be partially or totally fluorinated, which may be due to an equilibrium in the sol reaction. However, these traces will be in the range off around 1 to 2 mol % related to Ca $F_2$. In some embodiments 2 eq HF are used and additionally a metal additive is added to the sol reaction without a further addition of HF. This allows a reaction of the metal additive with the remaining not reacted HF, as discussed above, yielding some partially fluorinated metal additives while removing the unreacted HF from the reaction mixture. It has to be noted, that some of the used metal additives (such as Si, Zr, Ti, Al or Sn additives) will not yield completely fluorinated compounds—regardless of the applied (stoichiometric) amount of HF.

If a calcium precursor and a magnesium additive are used, the stoichiometric ratio of HF to calcium precursor ($n_{HF}/n_{Ca2+}$) can be varied between 1.85 up to 2.05, in particular between 1.9 up to 2.05, and additionally the stoichiometric ratio of HF to magnesium additive ($n_{HF}/n_{Mg2+}$) can be varied between 1.85 up to 2.05, in particular between 1.9 up to 2.05. In some embodiments, the stoichiometric ratio of HF to the calcium precursor and the magnesium additive will be fixed to exactly 2.0 for each. According to the inventor's observations, as long as stoichiometric amounts of HF (2 mol of HF for each mol calcium precursor and 2 mol HF for each mol magnesium additive) are used, formation of fluorides of eventual additive $MF_x$ (M=$Li^{1+}$, $Mg^{2+}$, $Ca^{2+}$, $Sr^{2+}$, $Ba^{2+}$, $Sn^{2+}$, $Zn^{2+}$, $Al^{3+}$, $Si^{4+}$, $Ti^{4+}$, $Zr^{4+}$, $Sn^{4+}$, $Sb^{3+}$ or $Sb^{5+}$, x is equal to the oxidation state of the metal M) is suppressed as evidenced by NMR. Thus, for embodiments where calcium precursors, magnesium additive and further metal additives according to the above definition are present and an exact stoichiometric amount of 2 HF per calcium and 2 HF per magnesium are used, only the calcium precursor and the magnesium additive will be fluorinated. The term "only the calcium precursor and the magnesium additive will be fluorinated" refers to an essentially quantitative conversion of the calcium precursor. It is possible that in some embodiments, traces of the calcium precursor will not be fluorinated and traces of the additive can be partially or totally fluorinated. However, these traces will be in the range of around 1 to 2 mol % related to $CaF_2$ and $MgF_2$. In some embodiments 2 eq HF are used and additionally a further metal additive is added to the sol reaction without a further addition of HF. This allows a reaction of the metal additive with the remaining not reacted HF, yielding some partially fluorinated metal additives as discussed above.

In some embodiments, the stoichiometric ratio of HF to calcium precursor ($n_{HF}/n_{Ca2+}$) can be varied between 1.85 up to 1.95, in particular if chloride ions are present in the sol reaction solvent. The presence of chloride ions yields a "CaClF" species, which has very good sintering abilities (as will be discussed below). If strontium or barium are present in the reaction similar partially fluorinated species may be produced. Reference is also made to the discussion above concerning the "CaClF" species. The same applies to embodiments comprising a calcium precursor and a magnesium additive, wherein, in particular, at least some chloride is present in the sol reaction as discussed above.

In some embodiments, a calcium precursor and a metal additive are used and essentially all of the calcium and essentially the entire additive is fluorinated. Thus, in such embodiments, the HF stoichiometry is fixed to exactly 2.0 in reference to the content of calcium plus an additional amount for the metal additive, wherein the additional amount of fluoride that can react with the additive is computed according to the oxidation state of the additive and the amount of the additive employed in the reaction. For example, if 200 mmol $ZnCl_2$ (as a metal additive) and 1 mol calcium precursor are used, the amount of HF will be 2.4 mole. The addition of the metal additive compound before adding the HF solution allows a complete fluorination of the calcium precursor and the metal additive compound. In some embodiments, trace amounts of non-fluorinated compounds (1-2% of the calcium employed in the reaction) may persist in the sol thus formed, as discussed above. An analogue description applies if two or more different metal additives are used. In some embodiments, even with such a fixed HF stoichiometry only partially fluorinated additive compounds are observed.

In some embodiments, a calcium precursor and metal additives are used and essentially all of the calcium and some of the additive is fluorinated. Thus, in such embodiments, the HF stoichiometry is fixed to 2.0 in reference to the content of calcium derived from the calcium precursor employed in the reaction, plus an additional amount of HF, which is computed multiplying the oxidation state of the additive, the amount of the additive and the molar percentage of additive fluorination. Thus, according to the above example of 1 mol calcium precursor and 200 mmol zinc, the stoichiometry of HF can be selected in the range from 2.0 mol HF (essentially no fluorination of the additive takes place) to 2.4 mol HF (essentially all of the additive is fluorinated). If the aim of the reaction is only a partial fluorination of the additive (e.g. of about 50% with reference to the above mentioned example), 2.2 mol HF will be applied. Depending on the amount of additive present in the reaction, the amount of HF for a potentially complete fluorination will be computed accordingly. For example, if 100 mmol $ZnCl_2$ and 1 mol of calcium precursor will be used, the amount of HF can be selected in the range from 2.0 to 2.2 mole HF. The same applies for the oxidation state. A lower oxidation state amounts to a lesser amount of HF necessary for a complete fluorination, whereby a higher oxidation state amounts to a higher amount of HF. For example, if a $Li^+$-additive (200 mmol) is used (instead of the above mentioned $ZnCl_2$), the range of HF will be between 2.0 and 2.2 mol HF, however, if a $Ti^{4+}$-additive (200 mmol) is used, the range of HF will be between 2.0 and 2.8 mol HF. An analogue description applies for two or more additives.

In some embodiments, a calcium precursor, a magnesium additive and at least one further metal additive are used and essentially the entire calcium precursor, essentially the entire magnesium additive and essentially the entire additive is fluorinated. Thus, in such embodiments, the HF stoichiometry is fixed to exactly 2.0 in reference to the content of calcium precursor and magnesium additive plus an additional amount for the metal additive, wherein the additional amount of fluoride that can react with the additive is computed according to the oxidation state of the additive and the amount of the additive employed in the reaction. Reference is made to the previous description concerning a complete fluorination and examples of the calculation. An analogue description applies if two or more different metal additives are used.

In some embodiments, a calcium precursor, a magnesium additive and at least one further metal additive are used and essentially the entire calcium precursor, essentially the entire magnesium additive and some or none of the further metal additive is fluorinated. Thus, in such embodiments, the HF stoichiometry is fixed to 2.0 in reference to the content of calcium derived from the calcium precursor and the content of magnesium derived from the magnesium additive employed in the reaction, plus an additional amount of HF, which is computed multiplying the oxidation state of the additive, the amount of the additive and the molar percentage of additive fluorination. Reference is made to the previous description concerning a partial fluorination and examples of the calculation. An analogue description applies if two or more different metal additives are used.

Thus, the HF stoichiometry can be fixed to 2.0 in reference to the content of calcium derived from the calcium precursor ($n_{Ca}$) used in the reaction according to the following formula $$n_{HF}=2*n_{Ca}, \text{ or}$$

in reference to the content of calcium derived from the calcium precursor ($n_{Ca}$) and the content of magnesium derived from the magnesium additive ($n_{Mg}$) used in the reaction according to the following formula $$n_{HF}=2*(n_{Ca}+n_{Mg}),$$

whereby $n_{HF}$ is the amount of HF in mole, $n_{Ca}$ is the amount of the calcium precursor, $n_{Mg}$ is the amount of magnesium additive.

In some embodiments, in particular if chloride is present, even if stoichiometric amounts of HF (in case of $n_{Ca}$ or ($n_{Ca}+n_{Mg}$)) are used, not all of the used HF will react with the calcium precursor or the calcium precursor and the magnesium additive. In such a case a further metal additive may be used, which will react with the unreacted HF, yielding some partially fluorinated additive compounds while removing the remaining HF from the sol reaction.

The inventors believe, without being bound by this theory, that unreacted HF may cause an inferior wettability of the sol, which generally occurs after a few days, with regard to other sols according to the invention comprising no or less unreacted HF.

Furthermore, the HF stoichiometry can be fixed to 2.0 in reference to the content of calcium derived from the calcium precursor ($n_{Ca}$) used in the reaction, plus an additional amount of HF ($n_{adHF}$) according to the following formula:

$$n_{HF}=2*n_{Ca}+n_{adHF}, \text{ or}$$

in reference to the content of calcium derived from the calcium precursor ($n_{Ca}$) and the content of magnesium derived from the magnesium additive ($n_{Mg}$) used in the reaction, plus an additional amount of HF ($n_{adHF}$) according to the following formula:

$$n_{HF}=2*(n_{Ca}+n_{Mg})+n_{adHF}$$

whereby $n_{HF}$ is the amount of HF in mole, $n_{Ca}$ is the amount of the calcium precursor, $n_{Mg}$ is the amount of magnesium additive and $n_{adHF}$ is the amount of HF for fluorination of additives.

The HF stoichiometry for the additive can be computed according to the oxidation state (Ox) of the additive and the amount of the additive and the selected degree of fluorination of said additive (A). The additional amount of HF ($n_{adHF}$) can be computed according to the following formula:

$$n_{adHF} = (n_{Ca} * \chi_{additive}) * Ox * A, \text{ in case of a calcium precursor, or}$$

$$n_{adHF} = [(n_{Ca} + n_{Mg}) * \chi_{additive}] * Ox * A, \text{ in case of a calcium precursor and a magnesium additive,}$$

whereby $n_{Mg}$ is the amount of magnesium additive, $n_{Ca}$ is the amount of calcium precursor, $\chi_{additive}$ is the molar percentage of said metal additive precursor in relation to said molar amount of said calcium precursor or the sum of said molar amount of said calcium precursor and said magnesium additive, Ox is the oxidation state of the metal of the additive and A is selected from $0 \leq A \leq 1$.

In some embodiments, A is 0, yielding essentially unfluorinated metal additive compounds and no additional HF is applied. In some embodiments, in cases of an incomplete reaction of the stoichiometric amount of HF and the calcium precursor or the calcium precursor and the magnesium additive, A is 0 and no additional HF is applied, yielding unfluorinated and partially fluorinated metal additive compounds, thus, removing or "neutralizing" the unreacted amount of HF. In some embodiments, A is 1, yielding essentially completely fluorinated metal additive compounds. In some embodiments, A is 0<A<1, yielding partially fluorinated metal additive compounds.

In some embodiments, a calcium precursor or a calcium precursor and a magnesium additive or a calcium precursor and at least one metal additive or a calcium precursor, a magnesium additive and at least one metal additive are used. The HF stoichiometry can be fixed to less than 2.0, particularly to 1.85 to 1.95, further in particular to 1.9 to 1.95, in reference to the content of calcium derived from the calcium precursor ($n_{Ca}$) or in reference to the content of calcium derived from the calcium precursor ($n_{Ca}$) and the content of magnesium derived from the magnesium additive ($n_{Mg}$) used in the reaction. In some embodiments, the HF stoichiometry can be fixed to less than 2.0, particularly to 1.85 to 1.95, further in particular to 1.9 to 1.95, in reference to the content of chloride derived from the calcium precursor ($n_{Ca}$) or in reference to the content of chloride derived from the calcium precursor ($n_{Ca}$) and the content of chloride derived from the magnesium additive ($n_{Mg}$) or in reference to the content of chloride derived from the calcium precursor ($n_{Ca}$) and/or the content of chloride derived from the magnesium additive ($n_{Mg}$) and/or the content of chloride derived from the metal additive used in the reaction. An analogue formula concerning $n_{HF}$ applies. Such a HF stoichiometry is particularly applied if the calcium precursor and/or the magnesium additive and/or the metal additive comprise chloride. This allows a partially fluorinated $CaCl_yF_{2-y}$ species (also named "CaClF" species) with y being between 0.1 and 0.4 to be formed. The presence of $CaCl_yF_{2-y}$ in a calcium sol yields, due to very good sintering abilities—after using the sol for a surface coating—to very enhanced mechanical properties without effecting the optical properties of the surface coating.

Depending on the metal of the additive used, the oxidation state of said metal, the amount of HF applied and the reaction conditions, the additive can be completely fluorinated, leading to $MF_x$ additives. Alternatively, parts of the additive can be completely fluorinated leading to $MF_x/MB_x$ mixtures of the additive as well as partially fluorinated additives $MF_mB_{x-m}$ or mixtures thereof (e.g. $MF_mB_{x-m}/MB_x$ or $MF_x/MF_mB_{x-m}/MB_x$), whereby x is equal to the oxidation state of the metal and m is equal to or smaller than the oxidation state and B is selected from the group comprising an alcoholate (RO—), a carboxylate (RCOO—), carbonate, an alkoxycarbonate, hydroxide, nitrate or a halide anion (selected from chloride, bromide and iodide), particularly an alcoholate or chloride. The partially fluorinated additives $MF_mB_{x-m}$ can comprise of identical fluorinated additives (e.g. only one residue is exchange by fluoride in the metal additive) as well as partially fluorinated additives in different states of fluorination (e.g. in some additive particles one residue is exchange by fluoride in the metal additive and in other additive particles two residues are exchanged or other possible combinations). Similar arguments apply if a magnesium additive, as discussed above, is used and the amount of HF is stoichiometric (2 eq HF) or less (e.g. 1.85 to 1.95 eq HF).

In some embodiments, the metal additive compound is selected from the group of $CaCl_2$, $MgCl_2$, $Ca(OEt)_2$, $Mg(OEt)_2$, $LiCl$, $Si(OC_2H_5)_4$, $Zr(O''Pr)_4$, $Ti(O'Pr)_4$, $Al(O'Pr)_3$, $Sb(OAc)_3$, $AlCl_3$, $Sb(OAC)_3$ or $Sn(OAc)_2$, and wherein O''Pr is 1-propyl and O'Pr is isopropyl, according to standard notation.

In some embodiments, additives comprising salts of inorganic acids are added to the reaction before the fluorination step. The inorganic acids produced during the fluorination step result in a faster clearing of the sol solution.

In some embodiments of the method of the invention, gaseous carbon dioxide is carried through the first volume prior to adding the second volume comprising anhydrous hydrogen fluoride. In one embodiment, the amount of carbon dioxide is adjusted in order for the first volume to reach a $CO_2$ content of between 1% and 5% (w/w). In one embodiment, the amount of carbon dioxide is adjusted in order for the first volume to reach a $CO_2$ content of 3% (w/w). Alternatively/additionally a catalytic amount of strong volatile acids may be applied.

A further distinction of embodiments making use of additives is the fact that the metal additive compound may be added after the fluorination step of the calcium precursor or the calcium precursor and the magnesium additive. In some embodiments, gaseous carbon dioxide is carried through the first volume prior to adding the second volume comprising anhydrous hydrogen fluoride. In one embodiment, the amount of carbon dioxide is adjusted in order for the first volume to reach a $CO_2$ content of between 1% and 5% (w/w), in particular to reach a $CO_2$ content of 3% (w/w).

In some embodiments, trifluoroacetic Acid (TFA) is added to the first volume or the second volume. The use of small amounts of TFA leads to shorter stirring times. By using TFA, the sol solutions clear faster. The inventor believes, without wishing to be bound by theory, that agglomeration products comprising a small amount of HF inside the agglomeration products are generated intermediately. Thus, some parts of the calcium precursor have not yet reacted with HF in a first phase of the reaction. A complete reaction with HF occurs when the HF diffuses into the agglomeration products and reacts with the remaining calcium precursor, which leads to a clear sol solution. By adding small amounts of TFA, the TFA can react with the remaining calcium precursor yielding a clear sol solution. The TFA-calcium-intermediate can be transformed by heating (as will be described later) to $CaF_2$. If metal additives (in comparison to the reaction of only calcium precursors) are additionally used, even less TFA is necessary in order to obtain a clear sol solution in a reasonable amount of time. This leads to a lesser amount of esterification and thus, to a lower water content in the solution, which prevents gelling.

Addition of said additives promotes the formation of mostly amorphous nano-$CaF_2$ particles that are even smaller than those obtained without additives, thus, resulting in an improved architectural ordering of the layer, and hence improved mechanical strength.

According to a second aspect of the invention, a calcium fluoride sol solution obtainable or obtained by a method according to the first aspect of the invention is provided. As an alternative of this second aspect of the invention, a calcium fluoride sol solution comprising $CaF_2$ particles in a non-aqueous solvent is provided. The calcium fluoride sol solution of the invention is characterized by a particle diameter size of smaller than (<) 50 nm, <40 nm, <30 nm, <20 nm or <10 nm. In some embodiments, the calcium fluoride sol solution is constituted by nanoscopic scale $CaF_2$ particles with particle sizes ranging from 3 to 30 nm. In some embodiments, the particle size ranges from 8 to 35 nm. In some embodiments, the particle size ranges from 3 to 20 nm.

Clear sols with small (between 3 and 20 nm) $CaF_2$-particles are obtained routinely when the precursors are fully soluble in the non-aqueous solvent, that is when clear precursor-solutions are obtained. Starting from dispersed precursor systems often does not result in the formation of clear sols. Opaque or non-transparent sols do not give high performance AR-layers. Dispersed precursor systems however have been found to clear quickly and render truly nanodisperse sol solutions when additive precursors as indicated in the previous paragraphs are employed. Alternatively the clearing of the sol may be supported by the use of $CO_2$, TFA and/or TEOS as discussed above.

The resulting additive fluoride particles may not be double salts of calcium and additive, but rather distinct species, present in the sol as a mixture of single components ($CaF_2$ and the $MF_x$ additive or $CaF_2$ and the $MB_x$ or additive, respectively). In some embodiments, the additive fluoride particles have a diameter size of smaller than (<) 50 nm, <40 nm, <30 nm, <20 nm, <10 nm, <5 nm, <4 nm or <3 nm. In some embodiments, the calcium fluoride particles have a particle diameter size of smaller than (<) 20 nm, 15 nm, <10 nm, <7 nm, <5 nm, <4 nm, or <3 nm. The same applies if more than two metal components are used.

Depending on the reaction conditions resulting additive fluoride particles may be double salts of calcium and additive present in the sol as a mixture of double salt components ($CaF_2/MF_x$ additive or $CaF_2/MB_x$ or $MF_mB_{x-m}$ additives, respectively, as discussed above). In some embodiments, the double salt component particles have a diameter size of smaller than (<) 50 nm, <40 nm, <30 nm, <20 nm, <10 nm, <5 nm, <4 nm or <3 nm. In some embodiments, the double salt component particles have a particle diameter size of smaller than (<) 20 nm, 15 nm, <10 nm, <7 nm, <5 nm, <4 nm, or <3 nm. The same applies, if more than two metal components are used, yielding multiple salt components.

In some embodiments, the sol reaction results in a mixture of the single component particles and the double (multiple) salt particles with the parameters as discussed above.

The calcium fluoride sol solution of the invention is characterized by a solution comprising an amount of $CaF_2$ particles and, additionally, an amount of additive particles, derived from a magnesium additive and/or a metal additive (as described above), characterized by a general formula $MF_mB_{x-m}$, whereby $M^{n+}$ is selected from the group of $Li^+$, $Mg^{2+}$, $Ca^{2+}$, $Sr^{2+}$, $Ba^{2+}$, $Sn^{2+}$, $Zn^{2+}$, $Al^{3+}$, $Si^{4+}$, $Ti^{4+}$, $Zr^{4+}$, $Sn^{4+}$, $Sb^{3+}$ or $Sb^{5+}$, B is an anionic ligand to M, x is equal to the oxidation state of the metal M and m is equal to or smaller than the oxidation state of the metal M. In some embodiments, B is selected from the group comprising an alcoholate (RO—) a carboxylate (RCOO—), carbonate, an alkoxycarbonate, hydroxide, nitrate or a halide anion (selected from chloride, bromide and iodide). In some embodiments, B is selected from chloride, methanolate, ethanolate, propoxylate, buthylate, acetate or lactate.

In some embodiments, the sol solution comprises essentially only fully fluorinated additive particles, wherein essentially all ligand B has been exchanged for fluoride, in other words, the additive component of the sol solution is characterized by a formula $MF_x$, with x equal to the oxidation state of the metal M.

In some embodiments, the sol solution comprises essentially only partially fluorinated additive particles, wherein some but not all ligand B has been exchanged for fluoride, in other words, the additive component of the sol solution is characterized by a formula $MF_mB_{x-m}$, with m being in the range of 0<m<x. In some such embodiments, m is 0.1 x, 0.2 x, 0.3 x, 0.4 x, 0.5 x, 0.6 x, 0.7 x, 0.8 x, or 0.9 x. In some embodiments, m is in the range of 0<m<x, wherein x is the oxidation state of the metal M and m and x are natural numbers. Examples of such partially fluorinated additive particles are—without being limited to —$SiF(OR)_3$, $SiF_2(OR)_2$, $SiF_3(OR)$.

In some embodiments, the sol solution may comprise also some unfluorinated calcium particles, as discussed above. An example of such an unfluorinated additive particle is—without being limited to—$Ca(OEt)_2$, which is due to an incomplete reaction of HF with the $Ca(OEt)_2$ precursor (optionally a "neutralisation" of the remaining HF by adding a metal additive, as described above may be applied). The amount of such unfluorinated calcium precursors is around 1 to 2% in relation to the amount of used calcium precursor. Additionally the amount of unfluorinated calcium precursors may be elevated by using less than a stoichiometric amount of HF.

In some embodiments, if chloride is present in the sol reaction, the sol solution may comprise also some partially fluorinated calcium particles, wherein some but not all of the precursor ligand has been exchanged for fluoride, in other words, the calcium component of the sol solution is characterized by a species $CaCl_yF_{2-y}$, with y being in the range of 0.1 to 0.4.

Examples of such partially fluorinated additive particles are—without being limited to—$CaCl_{0.1}F_{1.9}$ or $CaCl_{0.4}F_{1.6}$ (see also sections concerning the $CaCl_yF_{2-y}$ species). The chloride may derive for example, from using a calcium chloride precursor or a calcium ethanolate precursor and a calcium chloride additive.

In some embodiments, the sol solution comprises essentially only non-fluorinated additive particles, wherein essentially none of ligand B has been exchanged for fluoride, in other words, the additive component of the sol solution is characterized by a formula $MB_x$.

In some embodiments, the sol solution comprises fully fluorinated additive particles, partially fluorinated additive particles and non-fluorinated particles in a combination. Additionally partially fluorinated calcium precursor particles and non-fluorinated calcium precursor particles may be present.

In some embodiments, the sol solution comprises $CaF_2$ particles and $MB_x$ metal additive particles, whereby M is selected from the group of $Li^+$, $Ca^{2+}$, $Sr^+$, $Ba^{2+}$, $Sn^{2+}$, $Zn^{2+}$, $Al^{3+}$, $Si^{4+}$, $Ti^{4+}$, $Zr^{4+}$, $Sb^{3+}$ or $Sb^{5+}$, and B is an anionic ligand, and x is equal to the oxidation state of the metal M. B can be selected from the group comprising an alcoholate (RO—), a carboxylate (RCOO—), carbonate, an alkoxycarbonate, hydroxide, nitrate or a halide anion (selected from chloride, bromide and iodide), in particular chloride, methanolate, ethanolate, propoxylate, buthylate, acetate or lactate.

In some embodiments, the sol solution comprises $CaF_2$ particles and an amount of additive particles selected from the group comprising LiF, $CaF_2$, $SrF_2$, $BaF_2$, $SnF_2$, $AlF_3$, $SbF_3$, $SbF_5$, $ZrF_4$, and/or $ZnF_2$.

In some embodiments, the calcium fluoride sol solution of the invention comprises an amount of additive particles of the formula $MF_mB_{x-m}$, whereby $M^{n+}$ is selected from the group comprising $Li^+$, $Mg^{2+}$, $Ca^{2+}$, $Sr^{2+}$, $Ba^{2+}$, $Sn^{2+}$, $Zn^{2+}$, $Al^{3+}$, $Si^{4+}$, $Ti^{4+}$, $Zr^{4+}$, $Sn^{4+}$, $Sb^{3+}$ or $Sb^{5+}$, whereby x is equal to the oxidation state of M, m is equal to or smaller than x, B is selected from the group comprising an alcoholate (RO—), a carboxylate (RCOO—), carbonate, an alkoxycarbonate, hydroxide, nitrate or a halide anion (selected from chloride, bromide and iodide). In some embodiments, B is a chloride, methanolate, ethanolate, propoxylate, buthylate, acetate or lactate.

The calcium fluoride sol solution of the invention is characterized by a solution comprising an amount of $CaF_2$ particles, an amount of $MgF_2$ particles or $MgF_mB_{x-m}$ particles, derived form the magnesium additive, and, may comprise additionally, an amount of further additive particles characterized by a general formula $MF_mB_{x-m}$, whereby $M^{n+}$ is selected from the group of $Li^+$, $Ca^{2+}$, $Sr^{2+}$, $Ba^{2+}$, $Sn^{2+}$, $Zn^{2+}$, $Al^{3+}$, $Si^{4+}$, $Zr^{4+}$, $Sn^{4+}$, $Sb^{3+}$ or $Sb^{5+}$, B is an anionic ligand to M, x is equal to the oxidation state of the metal M and m is equal to or smaller than the oxidation state of the metal M. In some embodiments, B is selected from the group comprising an alcoholate (RO—), a carboxylate (RCOO—), carbonate, an alkoxycarbonate, hydroxide, nitrate or a halide anion (selected from chloride, bromide and iodide). In some embodiments, B is selected from chloride, methanolate, ethanolate, propoxylate, buthylate, acetate or lactate.

The sol solution comprising fully fluorinated, partially fluorinated or non-fluorinated additive particles $MF_mB_{x-m}$ can be provided by a method as described above, using no additional amount of HF, an additional amount of HF ($n_{adHF}$) or using a stoichiometric amount of HF with respect to the applied calcium precursor or calcium precursor and magnesium additive (see the discussion above concerning essentially quantitative conversion of the additive). The sol solution can comprise, depending on the conditions applied, only $MB_x$, $MF_x$ or $MF_mB_{x-m}$ additives as well as mixtures thereof. (e.g. $MF_mB_{x-m}/MB_x$ or $MF_x/MF_mB_{x-m}/MB_x$). Additionally unfluorinated calcium particles or a "CaClF" species may be present.

In some embodiments, the sol solution is obtained according to a method described according to the first aspect of the invention, whereby the metal additive is added after the fluorination with HF (computed according to the amount of calcium precursor or calcium precursor and magnesium additive only). In some embodiments, the calcium fluoride sol solution of the invention comprises an amount of additive particles selected from the group comprising $CaCl_2$, $MgCl_2$, $Ca(OEt)_2$, $Mg(OEt)_2$, LiCl, $Si(OC_2H_5)H_4$, $Zr(O^nPr)_4$, $Ti(O^iPr)_4$, $Al(O^iPr)_3$, $Sb(OAc)_3$, $AlCl_3$, $Sb(OAC)_3$ or $Sn(OAc)_2$ or partially fluorinated particles thereof, and wherein $O^nPr$ is 1-propyl and $O^iPr$ is isopropyl. In some embodiments, the calcium fluoride sol solution of the invention comprises $CaCl_yF_{2-y}$.

Where a particular application requires, the properties of the $CaF_2$-layers can be adjusted regarding their mechanical and/or optical properties by introducing further metal additives (see preceding section), by the method described above. Surprisingly, if these metal additive compounds are added to the calcium precursor or calcium precursor and magnesium additive solution before adding the requested stoichiometric amount of HF (calculated according to the amount of calcium precursor or calcium precursor and magnesium additive and the further metal additive, as described previously), the resulting $CaF_2$-layers show significantly improved and distinctly different properties as compared to a solution where metal fluorides (e.g. $CaF_2$-, $SrF_2$-, $AlF_3$-, or $ZnF_2$-particles) are added to the synthesized pure $CaF_2$-sol subsequently. The inventor believes that the prior addition of the metal additive compound—before adding the requested stoichiometric amount HF—positively influences the seed crystal and particle generation, leading to better dispersion of the non-calcium additives.

Where a particular application requires, the properties of the $CaF_2$-layers can be adjusted regarding their mechanical and/or optical properties by introducing further metal additives (see preceding section), by the method described above. If these metal additive compounds are added to the calcium precursor or calcium precursor and magnesium additive solution after adding the requested stoichiometric amount of HF (calculated according to the amount of calcium precursor or calcium precursor and magnesium additive) and no additional amount of HF or an additional amount of HF, which is less than the stoichiometric amount with respect to the amount of metal additive (see discussion concerning a partially fluorinated additive) the resulting $CaF_2$-layers show significantly improved and distinctly different properties as compared to a solution where metal additives are added before HF is added to the sol reaction. Thus, even better result can be obtained, if the metal additive is added after adding the requested stoichiometric amount of HF.

The inventors believe, without being bound by this theory, that this is due to a higher amount of a free electrolyte concentration and the reaction of eventually unreacted HF (as discussed) with the metal additive, which leads to a stabilization of the particles in the sol.

Where a particular application requires, the properties of the $CaF_2$-layers can be adjusted regarding their mechanical and/or optical properties by introducing further $M^{n+}$-additives (by way of non-limiting example, $M^{n+}=Li^+$, $Mg^{2+}$, $Ca^{2+}$, $Sr^{2+}$, $Ba^{2+}$, $Sn^{2+}$, $Zn^{2+}$, $Al^{3+}$, $Si^{4+}$, $Ti^{4+}$, $Zr^{4+}$, $Sn^{4+}$, $Sb^{3+}$ or $Sb^{5+}$) directly to the $Ca^{2+}$-precursor solution. Surprisingly, if these precursors are added to the $Ca^{2+}$-precursor solution after adding the requested stoichiometric amount HF, with respect to the amount of calcium precursor the resulting $CaF_2$-layers show significantly improved and distinctly different properties as compared to the prior addition of e.g. $Mg(OAc)_2$-, $Al(O^iPO_3$-, or $SiO_2$-particles to the calcium precursor. The same may applies for further metal additives if a calcium precursor and a magnesium additive are used, as discussed above.

In some embodiments, the calcium fluoride sol solution of the invention comprises an amount of additive particles selected from the group comprising $MgF_2$, $SrF_2$, $BaF_2$, $AlF_3$, $SiF_4$, $ZrF_4$, $TiF_4$, and/or $ZnF_2$. In some embodiments, the amount of said additive particles, in relation to the amount of $CaF_2$ particles, is 1:5 to 1:1000, as measured in molar equivalent of additive to calcium.

In some embodiments, the additive is a magnesium additive compound, which is present in an amount of 1 mole (1:1) to 0.01 mole (1:100) per mole calcium. In some embodiments, the additive is present in an amount of 0.99 mole (99:100) to 0.01 mole (1:100) per mole calcium. In some embodiments, the additive is present in an amount of 1 mole (1:1) to 0.25 mole (1:4) per mole calcium. In some embodiments, the additive is present in an amount of 1 mole (1:1) to 0.4 mole (1:2.5) per mole calcium. In some embodiments, the additive is present in an amount of 0.67 mole (1:1.5) to 0.4 mole (1:2.5) per mole calcium. In some embodiments, the additive is present in an amount of 1 mole (1:1) to more than 0.25 mole per mole calcium. In some embodiments, the additive is present in an amount of 0.4 mole (1:2.5) to more than 0.25 mole per mole calcium. In some embodiments, the additive is present in an amount of 0.99 mole (1:99) to more than 0.25 mole per mole calcium.

In some embodiments, said amount of metal additive particles in the sol solution, is 1:5 to 1:100, as measured in molar equivalent of additive to calcium precursor or calcium precursor and magnesium additive (as discussed above). In some embodiments, the metal additive compound is present in an amount of 0.2 mole (1:5) to 0.01 mole (1:100) per mole to calcium precursor or calcium precursor and magnesium additive. In some embodiments, the metal additive compound is present in an amount of 0.2 mole (1:5) to 0.04 mole (1:25) per mole to calcium precursor or calcium precursor and magnesium additive. In some embodiments, the metal additive compound is present in an amount of 0.2 mole (1:5) to 0.08 mole (1:12.5) per mole to calcium precursor or calcium precursor and magnesium additive. In some embodiments, the metal additive compound is present in an amount of 0.1 mole (1:10) to 0.04 mole (1:25) per mole to calcium precursor or calcium precursor and magnesium additive. In some embodiments, the metal additive compound is present in an amount of 0.04 mole (1:25) to 0.01 mole (1:100) per mole to calcium precursor or calcium precursor and magnesium additive. This applies also for essentially completely fluorinated, partially fluorinated or essentially unfluorinated metal additives.

It is understood that the sol may comprise in particular the specified compounds and specified amounts of these compounds as described in the embodiments concerning the method for obtaining a calcium sol.

The calcium fluoride sol solution of the invention is characterized by comprising nanoscopic scale $CaF_2$ and $MB_x$, $CaF_2$ and $MF_mB_{m-x}$ or $CaF_2$ and $MF_x$ or mixtures of the aforementioned particles with particle that have a diameter size of smaller than (<)<50 nm, <40 nm, <30 nm, <20 nm, <10 nm, <5 nm, <4 nm or <3 nm. In some embodiments, the particle diameter size is smaller than (<) 20 nm, <15 nm, <10 nm, <7 nm, <5 nm, <4 nm, or <3 nm. In some embodiments, the particle size ranges from 3 to 18 nm. In some embodiments, the particle size ranges from 8 to 18 nm. In some embodiments, the particle size ranges from 8 to 12 nm. In some embodiments, the particle size ranges from 3 to 10 nm. In some embodiments, the particle size ranges from 4 to 8 nm.

The particle size can be adjusted by varying the parameters of the process according to the first aspect of the invention. Formation of smaller particles is favored at temperatures between 20° C. and 30° C., slow addition of HF (over 30 to 60 minutes) and very high speeds of stirring (300 rpm). In some embodiments a stirring of about 600 to 1000 rpm is applied. Lower temperatures or slower stirring will generally favor formation of larger particles.

The solvent may be selected as discussed above in respect to the method of the invention. In some embodiments, the non-aqueous solvent is methanol. In some embodiments, the non-aqueous solvent is ethanol or isopropanol, particularly ethanol.

In some embodiments, said additive particles are smaller than 50 nm in diameter.

An important parameter in handling nanoparticle sol solutions for industrial applications is the concentration of the solution, with higher concentrations allowing more options to the user. High concentrations additionally lead to lower costs in transporting and storing the solution prior to its use. The sol solutions of the invention show distinctly greater stability at high concentrations when compared to sol solutions of the art.

In some embodiments, the dynamic viscosity of the sol solution is in the range of 1.0 to 8.0 mPa s, in particular in the range of about 1.3 to 3.5 mPa s.

In some embodiments, the calcium fluoride sol solution of the invention has a calcium content of larger than (>) 0.2 mol/l, 0.4 mol/l, 0.5 mol/l, 0.6 mol/l, 0.7 mol/l, 0.8 mol/l, 0.9 mol/l, 1.0 mol/l, 1.2 mol/l, 1.4 mol/l, 1.6 mol/l, 1.8 mol/l or 2.0 mol/l. The concentration of the $CaF_2$-sol can range from 0.05 to 2 mol/l. In some embodiments, the concentration is between 0.15 and 0.5 mol/l. In some embodiments, the calcium fluoride sol solution of the invention has a calcium content equal to or larger than 0.2 mol/L, 0.3 mol/L, 0.4 mol/L, 0.5 mol/L, 0.6 mol/L, 0.7 mol/L or 0.8 mol/L. In some embodiments, the calcium fluoride sol solution of the invention has a calcium content of 0.6 mol/L. In some embodiments, the calcium fluoride sol solution using ethanol or isopropanol, particularly ethanol, of the invention has a calcium content in the range of about 0.2 mol/L to 0.8 mol/L, in particular of about 0.2 mol/L to 0.6 mol/L. In some embodiments, the calcium fluoride sol solution using ethanol or isopropanol of the invention has a calcium content in the range of about 0.2 mol/L to 0.8 mol/L, in particular 0.2 mol/L to 0.4 mol/L.

To some extent, the maximum concentration of the sol solution has been found to depend on the educt components. One particularly stable sol is obtained by reacting calcium lactate in methanol or ethanol, whereby solutions exceeding 1 mol/l can be obtained and stored without losing the distinct clarity of the solution over many months.

In some embodiments, the calcium fluoride sol solution of the invention is stable at room temperature for more than six weeks. Such stability is of advantage not only because gelling of the sol solution (which is generally irreversible) leads to material loss, but also because the recipients used to store the gelled solution need to be cleaned, which can be a laborious and expensive task.

According to a third aspect of the invention, a method for coating a surface is provided, comprising the steps of
 a. providing a calcium fluoride sol solution prepared according to the method related as the first aspect of the invention;
 b. contacting the surface with the calcium fluoride sol solution;
 c. drying said surface; and
 d. exposing said surface to a thermal step, wherein said surface is exposed to a temperature ranging from 15° C. to 500° C., in particular 300 to 500° C.

In some embodiments, a method for coating a surface is provided, comprising the steps of
 a. providing a calcium fluoride sol solution;
 b. contacting the surface with the calcium fluoride sol solution;
 c. drying said surface; and
 d. exposing said surface to a first thermal step, wherein said surface is exposed to a first temperature ranging from 15° C. to 100° C.

The calcium fluoride sol solution has been obtained, or has the qualities of a sol solution that can be obtained, by a method according to the first aspect of the invention. Alternatively, a sol solution having the qualities described above is employed.

A number of methods of applying the sol solution to the surface offer themselves. In some embodiments, the coating is applied by spin coating or by dip-coating. In some embodiments, the coating is applied by spraying. The person skilled in the art will recognize the most suitable process of application depending on the shape of the substrate surface to be coated.

In some embodiments, the dynamic viscosity of the sol solution is in the range of 1.0 to 8.0 mPa s, in particular in the range of about 1.3 to 3.5 mPa s.

The drying allows for the removal of the solvent and residual components of the sol solution, mainly the lactic acid formed, and any additional acid formed by reaction of any eventual metal additive compound(s) with HF, or any subsequent reaction products derived thereof, such as esters. Depending on the compounds used in making the sol solution, the drying may be applied at room temperature for a few minutes to several hours. In some embodiments, the drying takes place, during the time interval between applying the coating on the surface and exposing the surface to a thermal step (e.g. the time between removal of the surface from the sol solution after dipping the surface in the sol solution and bringing the surface to an application for exposing the surface to thermal step). The drying allows for the removal of a large part of solvent and residual components of the sol solution, however, not all these components can be removed completely. Some will remain under these conditions in pores of the coating. The aim of the drying is to provide a smear-resistant coating.

In some embodiments, the drying step occurs for 10 min at room temperature.

In some embodiments, a thermal step is applied, wherein said surface is exposed to a temperature ranging from 100° C. to 500° C. In some embodiments a temperature in the range of about 250° C. to 500° C. is used. In some embodiments a temperature in the range of about 400° C. to 500° C. is used. This thermal step may be employed to sinter the coating, leading to improved mechanical stability.

In some embodiments, the thermal step will be applied to the surface in such a way that the surface is directly exposed to the necessary temperature, e.g. the surface is exposed to 450 C. Alternatively the surface can be exposed to a slowly increasing temperature interval until the necessary temperature (e.g. 450° C.) is reached. Alternatively higher temperatures may be applied if necessary. In some embodiments, the thermal step has a duration of 5 to 30 min. In all cases these thermal treatment can be performed at ambient pressure. In some embodiments, the thermal step (at a temperature of 450° C.) has a duration of 15 min. In some embodiments, the coating is allowed to cool down slowly over longer period of time (preferential between 100 and 150 min). The slow cooling of the heated coating will result in better characteristics concerning the mechanical properties of the coating. In some embodiments, the surface is exposed after the drying and prior to the thermal step to an additional drying temperature, wherein said surface is exposed to a drying temperature ranging from 15° C. to 100° C. for a certain amount of time.

The drying and first thermal step allow for the removal of solvent and residual non-fluoridic components of the sol solution, mainly the acid formed by reacting of the precursor compound(s) with HF, or any subsequent reaction products derived thereof, such as esters. Depending on the compounds used in making the sol solution, the requirements for time and temperature of the process will vary from room temperature to temperatures higher than 100° C., and from a few minutes to several hours. The drying and the additional drying temperature allow for the removal of a large part of solvent and residual components of the sol solution, however, not all these components can be removed completely. Some will remain under these conditions in pores of the coating. The aim of the drying and the additional drying temperature is to provide a smear-resistant coating.

In some embodiments, 80° C. is used for the additional drying temperature which occurs for 10 min. In some embodiments, after the first thermal step, a second thermal step is applied wherein said surface is exposed to a second temperature ranging from 300° C. to 500° C. This second thermal step may be employed to sinter the coating, leading to improved mechanical stability.

In some embodiments, one thermal post-treatment is applied after depositing the $CaF_2$-layer.

In some embodiments, a two-step thermal process is applied, wherein the substrate is treated in a first thermal step between room temperature and 100° C., and in a second thermal step at between 250 and 550° C. In some embodiments, the first thermal step has a duration of 5 to 60 min. In some embodiments, the second thermal step has a duration of 5 to 30 min. In one embodiment, a two-step thermal process has a first thermal step between 70 and 90° C. for 5 to 60 min, and a second thermal step between 300° C. and 500° C. for 5 to 30 min. In all cases these thermal treatment can be performed at ambient pressure. In some embodiments, after the additional drying temperature, the thermal step is applied (two-step thermal process), wherein said surface is exposed to a temperature ranging from 100° C. to 500° C. In some embodiments the temperature of the thermal step is in the range of about 250° C. to 500° C. is used. In some embodiments, a temperature in the range of about 400° C. to 500° C. is used for the thermal step. This thermal step may be employed to sinter the coating, leading to improved mechanical stability.

In some embodiments, the thermal step will be applied separately after the additional drying temperature. It is thus possible to allow for a cooling of the coating after the additional drying temperature. In some embodiments, the thermal step will be applied directly after the application of the additional drying temperature, thus, no cooling of the coating is allowed until after the thermal step is finished. In some embodiments, the thermal step will be applied directly after the additional drying temperature, whereby the coating is heated slowly until the necessary end temperature is reached (e.g. 450° C.).

In some embodiments, the additional drying temperature exposure has a duration of 5 to 60 min. In some embodiments, the thermal step has a duration of 5 to 30 min. In one embodiment, a two-step thermal process has an additional drying temperature between 70 and 90° C. for 5 to 60 min, and a thermal step between 300° C. and 500° C. for 5 to 30 min. In all cases these thermal treatments can be performed at ambient pressure. In some embodiments, the additional drying temperature exposure (temperature 80° C.) has a duration of 10 min, whereby the thermal step (at a temperature of 450° C.) has a duration of 15 min. In some embodiments, the coating is allowed to cool down slowly over longer period of time (preferential between 100 and 150 min). The slow cooling of the heated coating will result in better characteristics concerning the mechanical properties of the coating.

Any of the sol solutions provided herein will result in porous and mechanically robust layers that can be obtained in just a single coatings step. If a sol solution prepared from calcium acetate is used practically no thermal decomposition can be observed during the first and/or second thermal step. Thus, no byproducts, in particular no solid carbonaceous residue due to the decomposition, will have a negative influence on the characteristic of the coatings.

According to a fourth aspect of the invention, a surface coating comprising calcium fluoride nanoparticles is provided. This coating is characterized by high porosity, a refractive index of between $n_{500}=1.18$ and $n_{500}=1.35$ and high scratch resistance.

According to one alternative of this fourth aspect of the invention, a surface coating comprising calcium fluoride nanoparticles is provided, characterized by a refractive index of between $n_{500}=1.18$ and $n_{500}=1.35$, and a porosity of 25% to 40%. According to yet another alternative of this fourth aspect of the invention, a surface coating comprising calcium fluoride nanoparticles is provided, characterized by a refractive index of between $n_{500}=1.18$ and $n_{500}=1.35$, a porosity of 25% to 40% and an amount of additive particles selected from the group comprising $MgF_2$, $SrF_2$, $BaF_2$, $AlF_3$, $SiF_4$, $ZrF_4$, $TiF_4$, and/or $ZnF_2$, said amount being 1:5 to 1:1000, as measured in molar equivalent of additive to calcium.

According to yet another alternative of this fourth aspect of the invention, a surface coating comprising calcium fluoride nanoparticles is provided, characterized by a refractive index of between $n_{500}=1.18$ and $n_{500}=1.35$, a porosity of 25% to 40% and an amount of $MF_mB_{x-m}$ particles, whereby M is selected from the group of $Li^+$, $Mg^{2+}$, $Ca^{2+}$, $Sr^{2+}$, $Ba^{2+}$, $Sn^{2+}$, $Zn^{2+}$, $Al^{3+}$, $Si^{4+}$, $Ti^{4+}$, $Zr^{4+}$, $Sb^{3+}$, $Sb^{5+}$, B can be a chloride or an oxide, x is equal to the oxidation state of the metal M and m is equal to or smaller than the oxidation state of the metal M, said amount being 1:5 to 1:100, as measured in molar equivalent of additive to calcium.

According to yet another alternative of this fourth aspect of the invention, a surface coating comprising calcium fluoride nanoparticles is provided, characterized by a refractive index of between $n_{500}=1.18$ and $n_{500}=1.35$, a porosity of 25% to 40% and an amount of $MF_mB_{x-m}$ particles, whereby M is $Mg^{2+}$ derived from the magnesium additive, B can be a chloride or an oxide, x is equal to the oxidation state of the metal M and m is equal to or smaller than the oxidation state of the metal M, said amount being 1:1 to 1:100, as measured in molar equivalent of additive to calcium.

In some embodiments, a surface coating comprising calcium fluoride nanoparticles is provided, characterized by a refractive index of between $n_{500}=1.18$ and $n_{500}=1.35$, a porosity of 25% to 40% and an amount of $MF_mB_{x-m}$ particles, whereby M is $Mg^{2+}$ derived from the magnesium additive, B can be a chloride or an oxide, x is equal to the oxidation state of the metal M and m is equal to or smaller than the oxidation state of the metal M, said amount being 1:1 to 1:100, as measured in molar equivalent of additive to calcium and an additional amount of $MF_mB_{x-m}$ particles, whereby M is $Ca^{2+}$, $Sr^{2+}$, $Ba^{2+}$, $Sn^{2+}$, $Zn^{2+}$, $Al^{3+}$, $Si^{4+}$, $Ti^{4+}$, $Zr^{4+}$, $Sn^{4+}$, $Sb^{3+}$, $Sb^{5+}$, B can be a chloride or an oxide, x is equal to the oxidation state of the metal M and m is equal to or smaller than the oxidation state of the metal M, said amount being 1:5 to 1:100, as measured in molar equivalent of additive to calcium.

In general, if calcium (or another metal) chloride or fluoride particles are present in the sol, they remain as the respective chlorides or fluorides in the surface coating, however, the other applied ligands will yield the respective calcium (or other applied metal) oxides.

In some embodiments, the surface coating comprises an amount additive particles $M^{n+}F_mB_{x-m}$ with m equal to the oxidation state n of the metal M or with m equal to 0 or with m selected from the range of 0<m<n or mixtures thereof, said amount being 1:5 to 1:100, as measured in molar equivalent of additive to calcium.

Reference is also made to the above mentioned embodiments with different amounts of applied metal additives.

In some embodiments, the surface coating comprises amount of additive particles selected from the group comprising $CaCl_2$, $MgCl_2$, LiCl, $Si(OC_2H_5)_4$, $Zr(O''Pr)_4$, $TiO'Pr^{\wedge}$, $Al(O'Pr)_3$ or $AlCl_3$ or partially fluorinated species thereof, in particular the "CaClF" species, or LiF, $CaF_2$, $SrF_2$, $BaF_2$, $AlF_3$, $ZrF_4$, and/or $ZnF_2$, said amount being 1:5 to 1:100, as measured in molar equivalent of additive to calcium, and wherein O''Pr is 1-propyl and O'Pr is isopropyl.

In some embodiments, the surface coating comprises an amount of additive particles selected from the group comprising $M^{n+}B_x$ metal additive particles, whereby $M^{n+}$ additives selected from the group of $Mg^{2+}$, $Ca^{2+}$, $Sr^{2+}$, $Ba^{2+}$, $Sn^{2+}$, $Zn^{2+}$, $Al^{3+}$, $Si^{4+}$, $Ti^{4+}$, $Zr^{4+}$, $Sn^{4+}$, $Sb^{3+}$, $Sb^{5+}$ and B can be an inorganic or organic compound, as described previously, said amount being 1:5 (20%) to 1:100 (1%), as measured in molar equivalent of additive to calcium. In some embodiment, the amount of additive ranges from 1:10 (10%) to 1:25 (4%) as measured in molar equivalent of additive to calcium. In one embodiment, the amount of additive ranges from 1:12.5 (8%) to 1:25 (4%) as measured in molar equivalent of additive to calcium.

In some embodiments, the surface coating comprises an amount of additive particles selected from LiX, whereby X is a halogen, in particular chloride, said amount being 1:5 to 1:100 (20% to 1%), as measured in molar equivalent of additive to calcium. In one embodiment, the amount of LiX additive ranges from 1:10 (10%) to 1:100 (1%) as measured in molar equivalent of additive to calcium. In one embodiment, the amount of LiX additive ranges from 1:25 (4%) to 1:100 (1%) as measured in molar equivalent of additive to calcium. In one embodiment, the amount of LiX additive is 1:100 (1%) as measured in molar equivalent of additive to calcium.

In some embodiments, the surface coating comprises an amount of additive particles selected from the group comprising $MgF_2$, $SrF_2$, $BaF_2$, $AlF_3$, $SiF_4$, $ZrF_4$, $TiF_4$, and/or $ZnF_2$, said amount being 1:5 to 1:1000, as measured in molar equivalent of additive to calcium. In one embodiment, the amount of additive ranges from 1:20 (5%) to 1:100 (1%) as measured in molar equivalent of additive to calcium.

In some embodiments, more than one metal additive according to the above mentioned embodiments may be present in the sol. In some embodiments, "CaClF" particles (see the discussion concerning $CaCl_yF_{2-y}$) are present in the surface coating.

In some embodiments, the surface coating comprises an amount of chloride in the range of 1.5% to 5.5% in particular 2.5% to 4%, as measured with a potentiometric determination of the solid layer with respect to the remaining elements of the surface coating. Moreover, EDX investigations clearly evidence the presence of chloride in the coating layer being homogenously distributed within the calcium fluoride layer.

In some embodiments, the surface coating of the invention is characterized by a porosity of 25% to 40%. The porosity allows the coating to comprise a refractivity index which is lower than the refraction index of $CaF_2$ while comprising a good mechanical stability. In some embodiments, the surface coating of the invention is characterized by a refractivity index between $n_{500}=1.19$ and $n_{500}=1.26$.

In the deposited $CaF_2$-layer, the additive compounds incorporated into the AR-layers are X-ray amorphous. The high degree of structural distortion caused by the invented synthesis approach that establishes exciting optical beside exciting mechanic properties.

According to a fifth aspect of the invention, a metal, a glass or a polymer, in particular an organic polymer, surface having a surface coating according to any of the above aspects of the invention is provided.

In some embodiments, the surface is a planar or a tubular glass surface. In some embodiments, the surface is a metal surface. In some embodiments, the surface is an organic polymer surface. In some embodiments, the surface is a thermoplast surface. In some embodiments, the surface is a lens surface in an optical system for a camera, an ophthalmological lens, a binocular, a microscope or similar optical device.

In some embodiments, a $CaF_2$-layer obtained by a process according to the invention exhibits a refractive indexes ranging from $n_{500}=1.18$ up to $n_{500}=1.35$ depending on the process management and the resulting composition of the $CaF_2$-sol, which depend on the amount of water carried into or produced by the sol reaction, the nature of eventual additives (Mg, Sr, Ba, Al, Si, Zr, Zn etc., in particular $Li^+$, $Mg^{2+}$, $Ca^{2+}$, $Sr^{2+}$, $Ba^{2+}$, $Sn^{2+}$, $Zn^{2+}$, $Al^{3+}$, $Si^{4+}$, $Ti^{4+}$, $Zr^{4+}$, $Sn^{4+}$, $Sb^{3+}$, $Sb^{5+}$) and their concentration, and the temperature of the post-treatment. Generally it seems that some additives increase the sintering ability of the $CaF_2$, thus, resulting in an increased mechanical robustness of the AR-layer, in particular $CaCl_yF_{2-y}$ additives. Whereas Al- and Li-additives do not impact the exciting optical properties, additives like Sn, Ti or Zr decrease slightly the optical transmittance due to their higher refractive indices. The inventor has found that in particular additive components (which can be a completely, a partially or a non-fluorinated compound as described above) with a low melting point increase the sintering ability and allow an increased mechanical robustness while comprising a higher porosity, thus, the influence on the optical properties is small and only a slight decrease, if at all, of the optical transmittance can be observed. Hence, the optimum content of additives has to be used in order to obtain high optical transmittance and high mechanical stability of the AR—$CaF_2$-layers as described above.

In some embodiments, for which the surface that is to be coated is an organic polymer surface, methanol based sol solutions are preferred. In some embodiments, the surface to be coated is an organic polymer surface and the sol solution comprises between 0% and 2% of additive particles selected from the group $MB_x$ or $MF_mB_{x-m}$ as described previously, in particular $CaCl_yF_{2-y}$. In some embodiments, for which the surface that is to be coated is an organic polymer surface, methanol based sol solutions are preferred. In some embodiments, the surface to be coated is an organic polymer surface and the sol solution comprises between 0% and 2% of additive particles selected from the group comprising $MgF_2$, $SrF_2$, $BaF_2$, $AlF_3$, $SiF_4$, $ZrF_4$, $TiF_4$, and/or $ZnF_2$.

In some embodiments, the surface is an organic polymer surface pretreated by a layer of polysilazane or by an inorganic network obtained through controlled hydrolysis and condensation of organically modified Si alkoxides (OR-MOCER, Fraunhofer-Institut für Silicatforschung ISC, Würzburg, Germany). In some embodiments, the surface is an organic polymer surface pretreated by corona poling.

In some embodiments, a $CaF_2$-layer obtained by a process according to the invention exhibit a mechanic stability and scratch resistance superior to that of $SiO_2$ porous AR layers known in the art. The AR layers obtained according the present invention are characterized by an easy production starting from common precursors. The sols as prepared by the method of the invention can directly be used for coating any substrate.

No other components like metal complexes, organic binders, co-polymers etc. have to be added to the sols in order to create fine-tuned porosity inside the layers. For some polymers, the presence of a mediator layer below or a cover layer above the $CaF_2$-layer is not necessary, but may be preferred to enhance optical or mechanical properties of the material.

The porosity of these layers can be tuned from 10 to 50%. In some embodiments, it ranges from 25 to 40%, in particular 30 to 45%. The synthesis conditions for achieving a certain porosity are in general determined by the sol synthesis conditions. As a rule, porosity of pure $CaF_2$ layers can be enhanced by addition of aforementioned additives during the sol synthesis. Different to porous $SiO_2$ layers, $CaF_2$-layers obtained by the process of the present invention exhibit high degree of hydrophobicity (the contact angle after the annealing process at 450° C. is above 120°). This quality results in markedly low water uptake, which for some embodiments can be below 10% in 90% humidity, whereas it is above 90% in case of a porous $SiO_2$-layer. In particular the $CaF_2$-layers without metal additives and $CaF_2$-layers which contain metal additives, whereby the metal additives are essentially completely fluorinated, exhibit a very high degree of hydrophobicity.

In some embodiments, AR $CaF_2$ layers obtained according to the method of present invention have a thicknesses ranging from 20 to 600 nm. Some embodiments are monolayers having a thicknesses ranging from 80 to 120 nm. In some embodiments, AR $CaF_2$ layers obtained according to the method of present invention show optical transmission between 97.5 and 99.8% depending on the content of additive $M^{n+}$. In general, the lower the $M^{n+}$-content, the higher is the optical transmission. Al- and Li-additives do not impact the optical properties, additives like Sn, Ti or Zr decrease slightly the optical transmittance due to their higher refractive indices. In general, the lower the additive content, the higher is the optical transmission.

In some embodiments, AR—$CaF_2$ layers obtained according to the method of present invention are characterized by high mechanical stability, especially scratch resistance according DIN EN 1096-2 (crockmeter test). In some embodiments, AR—$CaF_2$ layers obtained according to the method of present invention are characterized by hydrolysis resistance superior to the corrosion/hydrolysis resistance of $SiO_2$— and $MgF_2$ layers due to the extremely low $CaF_2$ solubility and its high temperature stability.

Wherever alternatives for single features such as the nature of calcium precursor, solvent, additive etc. are laid out herein as "embodiments", it is to be understood that such alternatives may be combined freely to form discrete embodiments of the entire process, sol solution, coating method or coating provided herein.

The invention is further illustrated by the following examples and figures, from which further advantages and embodiments of the invention may be derived.

SHORT DESCRIPTION OF THE FIGURES

Figure 1:
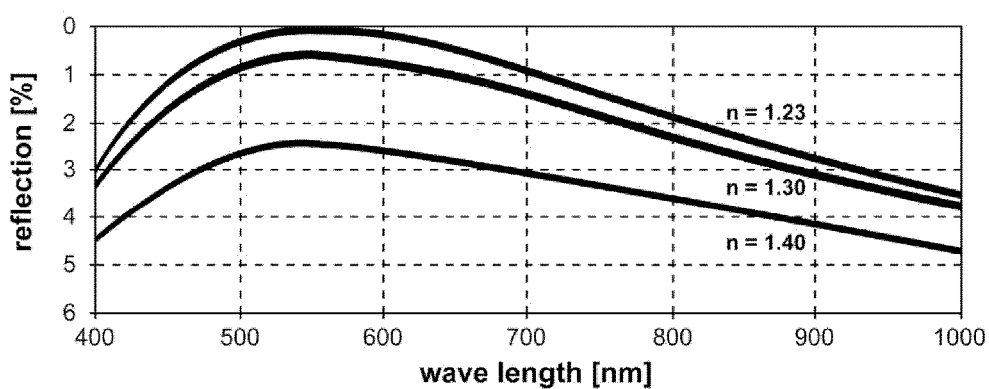
FIG. 1 shows the change in the optical transmittance of a coated material as a function of the refractive index of the thin film.
Figure 2:
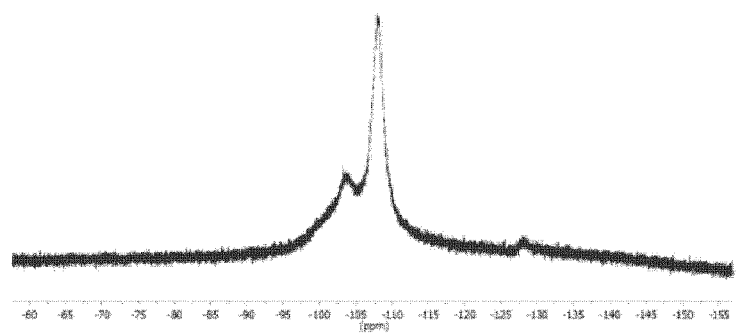
FIG. 2 shows a typical $^{19}$F-NMR-spectrum of a $CaF_2$ sol with the characteristic chemical shift of F in $CaF_2$.
Figure 3:
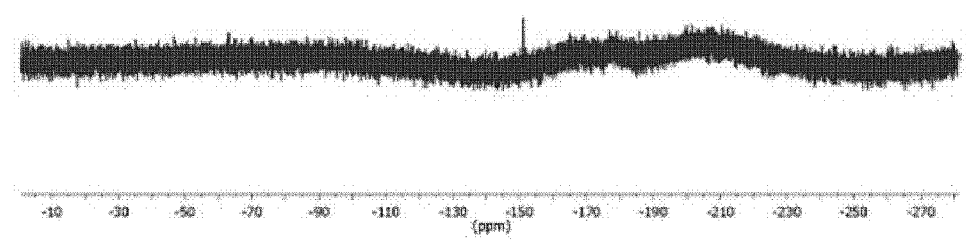
FIG. 3 shows a typical $^{19}$F-NMR-spectrum of a $CaF_2$ sol to which 10% $Mg^{2+}$ was given as additive.
Figure 4:
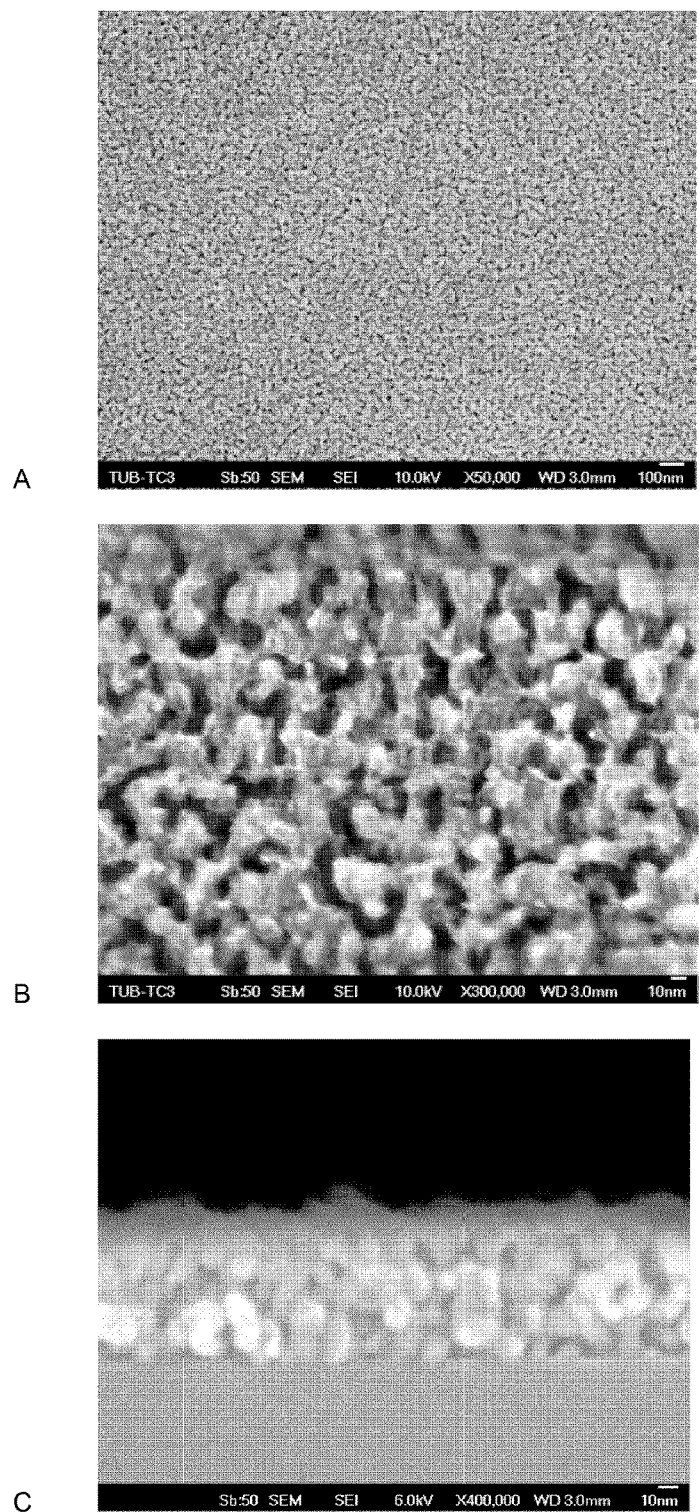

FIG. 4 shows a HR-SEM photograph of a $CaF_2$-layer obtained from the sol of example 4); A) indicates a very homogenous film formation; B) shows (at higher resolution than A) the uniformity of the pores which are distributed over the $CaF_2$-layer; C) shows a view perpendicular to the layer.

Figure 5:
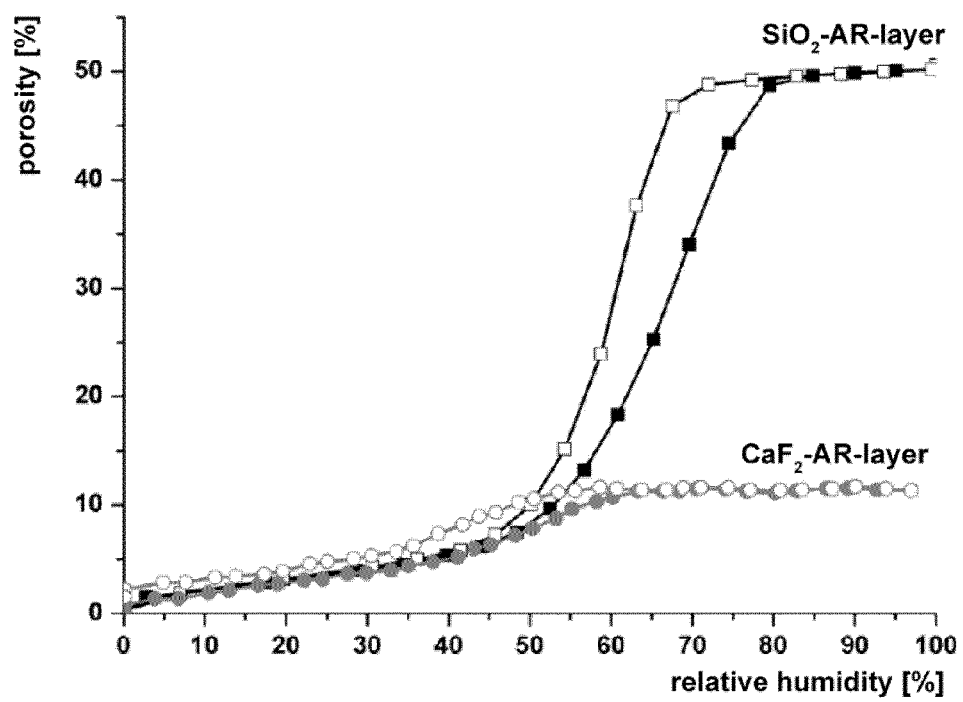

FIG. 5 displays the adsorption behaviour of a $CaF_2$-layer obtained from the sol of example 2). Up to about 70% humidity in air nearly no water uptake can be found. Thus for the sol of example 6) even up to 90% humidity the water uptake was below 10%.

Figure 6:
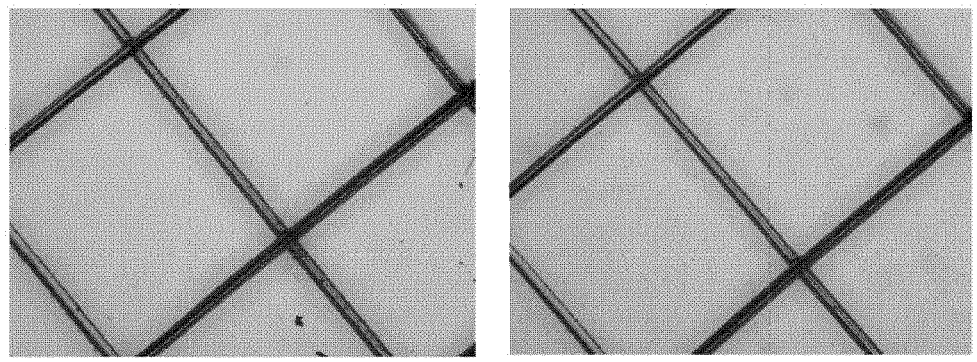

FIG. 6 shows a $CaF_2$ coated surface of PET on which a certain grid mark was introduced by a cutter. The left panel displays the surface as prepared, the right panel shows the surface after adhering a normed adhesive film (TESA, Beiersdorf AG, Hamburg, Germany) and tearing off the tape. As can be seen, the coated $CaF_2$ layer remains unaffected.

Figure 7:
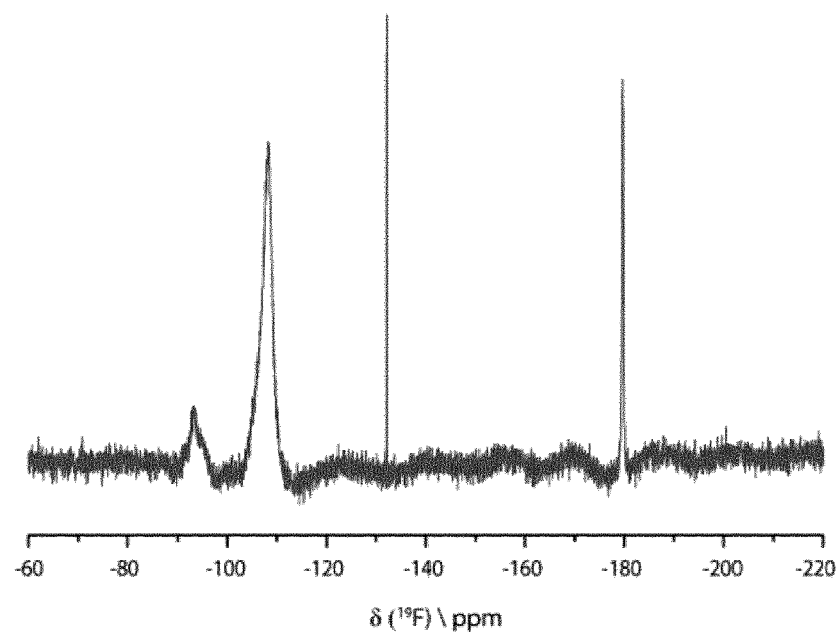

FIG. 7 shows a $^{19}$F-NMR-spectrum of a $CaF_2$ sol derived from a sol reaction in the presence of chloride (stoichiometric amount of HF) showing the chemical shift of $^{19}$F for HF (−178 ppm), $CaF_2$ (−108 ppm) and $CaCl_yF_{2-y}$ (−89 ppm).

Figure 8:
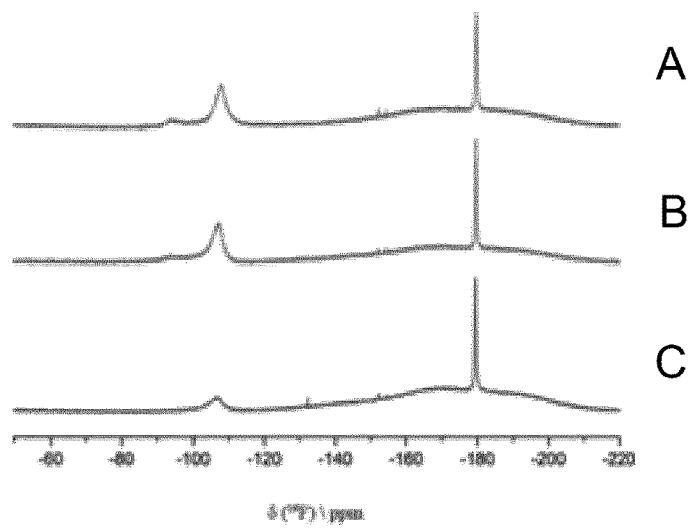

FIG. 8 shows three $^{19}$F-NMR-spectra of a $CaF_2$ sol derived from a sol reaction of $CaCl_2/Mg(OEt)_2$ with the chemical shift of $^{19}$F for $CaF_2$ and $CaCl_yF_{2-y}$ with different Ca/Mg contents with A) Ca/Mg; 90/10 after 1 day, B) Ca/Mg; 80/20 after 3 days and C) Ca/Mg; 50/50 after 3 days.

EXAMPLES

Synthesis of Clear $CaF_2$-Sols 1) 23.7 g dried calcium acetate were suspended in 450 ml methanol. Then, 50 ml methanol containing 6 g anhydrous HF (aHF) was added under rigorous stirring. After 7 days stirring at room temperature, a clear methanolic $CaF_2$-sol with a concentration of 0.3 mol/l was obtained. The kinematic viscosity of the sol was 1.4 mm$^2$ s$^{-1}$ and did not change over a period of 6 weeks.

2) 32.7 g calcium lactate were first dissolved in 150 methanol until a clear solution was formed. Then, 50 ml methanol containing 6 g aHF was added under rigorous stirring. To the clear sol formed after 3 days 300 ml ethanol were added resulting in a 0.3 molar $CaF_2$ sol with ca. 33 vol % methanol and 67 vol % ethanol. The kinematic viscosity of the sol was 1.6 mm$^2$ s$^{-1}$ and did not change over a period of 6 weeks.

3) 23.7 g dried calcium acetate were suspended in 450 ml methanol. To this suspension 3.12 g tetraethoxysilane (TEOS) were added under rigorous stirring followed by the addition of 50 ml methanol containing 6 g aHF. After 3 days stirring at room temperature, a clear methanolic $CaF_2$-sol with a concentration of 0.3 mol/l containing 10 mol % TEOS related to $CaF_2$ was obtained. The kinematic viscosity of the sol was 1.4 mm$^2$ s$^{-1}$, which increased slightly to 1.7 mm$^2$ s$^{-1}$ after 7 weeks.

4) 32.73 g calcium lactate and 1.43 g magnesium chloride were first dissolved in 90 ml methanol. To this solution 35 ml methanol containing 6.6 g aHF were added (molar ratio $n_{HF}/(n_{Ca2+}+n_{Mg2+})=2.1$). The clear 1.43 molar $CaF_2/MgF_2$-sol that has formed inside ca. 2 days was then diluted by adding 375 ml ethanol resulting in a 0.3 molar $CaF_2$ sol with ca. 25 vol % methanol and 75 vol % ethanol containing 10 mol % $MgF_2$. The kinematic viscosity of the sol was ca. 1.6 mm$^2$ s$^{-1}$ and remained unchanged over 6 weeks.

5) 32.73 g calcium lactate and 3.06 g aluminium isopropoxide were first dissolved in 150 ml methanol. To this solution 50 ml methanol containing 6.9 g aHF were added (molar ratio $n_{HF}/(n_{Ca2+}+n_{Al3+})=2$). The clear 0.75 molar $CaF_2$-sol that has formed inside ca. 4 days was then diluted by adding 300 ml ethanol resulting in a 0.3 molar $CaF_2$ sol with ca. 40 vol % methanol and 60 vol % ethanol containing 10 mol % $AlF_3$ related to $CaF_2$. The kinematic viscosity of the sol was ca. 1.5 mm$^2$ s$^{-1}$ and increased slightly to 1.7 over 6 weeks.

6) 218.2 g calcium lactate were suspended in 400 ml ethanol. To this suspension 10.4 g tetraethoxysilane (TEOS) were added under rigorous stirring followed by the addition of 100 ml ethanol containing 40 g aHF and 1.02 g trifluoroacetic acid (TFA). After 5 days stirring at room temperature, a clear ethanolic $CaF_2$-sol with a concentration of 2.0 mol/l containing 5 mol % TEOS and 2.5 mol % TFA related to $CaF_2$ was obtained. The kinematic viscosity of the sol was 2.3 mm$^2$ s$^{-1}$.

7) 23.4 g commercial calcium ethanolate and 2.3 g magnesium ethanolate were first suspended in 150 ml methanol. By carrying gaseous $CO_2$ through this suspension, a clear solution formed after the $CO_2$ content of the solution reached about 3 w %. To this solution 50 ml methanol containing 8 g aHF were added (molar ratio $n_{HF}/(n_{Ca2+}+n_{Mg2+})=2$; $n_{Ca2+}/n_{Mg2+}=9/1$). The clear sol that has formed after a few hours was further diluted by adding approx. 300 ml ethanol until an overall volume of 500 ml is obtained resulting in a 0.33 molar $CaF_2/MgF_2$-sol with ca. 40 vol % methanol and 60 vol % ethanol with a $CaF_2/MgF_2$ ratio ($n_{Ca}/n_{Mg}=9/1$)) c. The kinematic viscosity of the sol was ca. 1.5 mm$^2$ s$^{-1}$ and remained unchanged over 6 weeks.

8) In an alternative route as compared to example 7), calcium ethoxide was first prepared under in situ conditions by dissolving 8 g metallic calcium in 450 ml ethanol (technical grade). After complete dissolution a suspension of $Ca(OEt)_2$ formed. To this suspension 8 g aHF in 50 ml methanol were added until a clear sol formed after approx. 24 hours. The final clear $CaF_2$-sol had a concentration of 0.4 mol/l and a viscosity of 1.3 mm$^2$ s$^{-1}$ that slightly increased to 1.6 inside of 6 weeks.

9) 24.7 g calcium ethoxide were suspended in 450 ml ethanol. Then, 1.11 g waterfree $CaCl_2$ were dissolved. To this suspension, 50 ml ethanol containing 7.9 g anhydrous HF (aHF) were added under rigorous stirring. After 1 day stirring at room temperature, a clear ethanolic $CaF_2$-sol with a concentration of 0.4 mol/l was obtained. The kinematic viscosity of the sol was 1.3 mm$^2$ s$^{-1}$ and did not change over a period of 10 weeks. Following this general synthesis procedure, $CaF_2$-sols based on different amount of added waterfree $CaCl_2$ were obtained by changing the $Ca(OC_2H_5)_2$ to $CaCl_2$ ratio but keeping the overall $Ca^{2+}$-concentration and the amount of HF (molar HF/Ca ratio=1.97) and all the other reaction conditions constant. These results are summarized in the table 1.

TABLE 1

In all batches calcium ethylate and $CaCl_2$ together gave 0.2 mol $Ca^{2+}$ in 450 ml ethanol, meaning the concentration of the sol was 0.4 mol/l.

| No | $Ca(OC_2H_5)_2$ to $CaCl_2$ molar ratio | clear after hours | viscosity mm$^2$s$^{-1}$ after 6 weeks | HF/Ca ratio | Remarks |
|---|---|---|---|---|---|
| A | 95/5 | 24 | 1.3 | 1.97 | stable viscosity |
| B | 90/10 | 16 | 1.3 | 1.94 | stable viscosity |
| C | 80/20 | 14 | 1.4 | 1.9 | stable viscosity |
| D | 65/35 | 13 | 1.6 | 1.85 | stable viscosity |
| E | 51/49 | 13 | 1.6 | 1.80 | stable viscosity |

10) 24.7 g calcium ethoxide were suspended in 450 ml ethanol. Then, 1.19 g calcium chloride hexahydrate, $CaCl_2 \cdot 6H_2O$, were dissolved. To this suspension, 50 ml ethanol containing 7.9 g anhydrous HF (aHF) were added under rigorous stirring. After 12 hours stirring at room temperature, a clear ethanolic $CaF_2$-sol with a concentration of 0.4 mol/l was obtained. The kinematic viscosity of the sol was 1.5 $mm^2\ s^{-1}$ and did not change over a period of 10 weeks. Following this general synthesis procedure, $CaF_2$-sols based on different amount of added $CaCl_2 \cdot 6H_2O$ were obtained by changing the $Ca(OC_2H_5)_2$ to $CaCl_2 \cdot 6H_2O$ ratio but keeping the overall $Ca^{2+}$-concentration and the amount of HF (molar HF/Ca ratio=1.97) and all the other reaction conditions constant. These results are summarized in the table 2.

TABLE 2

In all batches calcium ethylate and $CaCl_2 \cdot 6H_2O$ together gave 0.2 mol $Ca^{2+}$ in 450 ml ethanol, meaning the concentration of the sol was 0.4 mol/l.

| No | $Ca(OC_2H_5)_2$ to $CaCl_2 \cdot 6H_2O$ molar ratio | clear after hours | viscosity $mm^2s^{-1}$ after 6 weeks | HF/Ca ratio | Remarks |
|---|---|---|---|---|---|
| A | 95/5 | 12 | 1.3 | 1.97 | stable viscosity |
| B | 90/10 | 10 | 1.5 | 1.94 | stable viscosity |
| C | 80/20 | 8 | 1.7 | 1.9 | stable viscosity |

11) 24.7 g calcium ethoxide were suspended in 450 ml ethanol. Then, 0.95 g waterfree $MgCl_2$ were dissolved. To this suspension, 50 ml ethanol containing 7.9 g anhydrous HF (aHF) were added under rigorous stirring. After 1 day stirring at room temperature, a clear ethanolic $CaF_2$-sol with an overall metal fluoride content ($CaF_2$ plus $MgF_2$) of 0.4 mol/l was obtained. The kinematic viscosity of the sol was 1.1 $mm^2\ s^{-1}$ and did not change over a period of 10 weeks. Following this general synthesis procedure, $CaF_2$-sols based on different amount of added waterfree $MgCl_2$ were obtained by changing the $Ca(OC_2H_5)_2$ to $MgCl_2$ ratio but keeping the overall $M^{2+}$-concentration ($M^{2+}=Ca^{2+}+Mg^{2+}$) and the amount of HF (molar HF/M ratio=1.97) and all the other reaction conditions constant. These results are summarized in the table 3.

TABLE 3

In all batches calcium ethylate and $MgCl_2$ together gave 0.2 mol $M^{2+}$ ($Ca^{2+} + Mg^{2+}$) in 450 ml ethanol, meaning the concentration of the sol was 0.4 mol/l.

| No | $Ca(OC_2H_5)_2$ to $MgCl_2$ molar ratio | clear after hours | viscosity $mm^2s^{-1}$ after 6 weeks | HF/Ca ratio | Remarks |
|---|---|---|---|---|---|
| A | 95/5 | 24 | 1.1 | 1.97 | stable viscosity |
| B | 90/10 | 16 | 1.2 | 1.94 | stable viscosity |
| C | 80/20 | 14 | 1.3 | 1.9 | stable viscosity |
| D | 70/30 | 14 | 1.2 | 1.86 | stable viscosity |
| E | 60/40 | 14 | 1.2 | 1.82 | stable viscosity |

12) 26.0 g calcium ethoxide were suspended in 450 ml ethanol. To this suspension, 50 ml ethanol containing 8 g anhydrous HF (aHF) were added under rigorous stirring. This was followed by an immediate addition of either TEOS $(Si(OEt)_4)$, or TMOS $(Si(OMet)_4)$, or zirconium n-propoxide $(Zr(O^nPr)_4)$, or titanium isopropoxide $(Ti(O^iPr)_4)$, or aluminium isopropoxide $(Al(O^iPr)_3)$. After certain time of stirring at room temperature, clear ethanolic $CaF_2$-sols with an overall $CaF_2$ content of 0.4 mol/l were obtained. The concentration of either Si, or, Zr, or Ti, or Al was 5, 10, and 20 mol %, respectively (related to $Ca^{2+}$). Following this general synthesis procedure, $CaF_2$-sols with different metal additives were obtained as summarized in table 4. The $Ca^{2+}$-concentration and the amount of HF (molar HF/M ratio=2.0) and all the other reaction conditions were kept constant.

TABLE 4

In all batches, the calcium ethylate concentration was 0.4 mol/L. In all batches 8 g HF in 50 ml ethanol were used (molar HF/$Ca^{2+}$ ratio = 2.0).

| No | Additive | Mol % additive | Clear after hours | Viscosity $mm^2s^{-1}$ after 6 weeks | Remarks |
|---|---|---|---|---|---|
| Ai | TEOS | 5 | 34 | 1.3 | stable sol |
| Aii | TEOS | 10 | 29 | 1.4 | stable sol |
| Bi | TMOS | 5 | 22 | 1.3 | stable sol |
| Bii | TMOS | 15 | 115 | 1.3 | stable sol |
| Ci | $Zr(O^nPr)_4$ | 5 | 30 | 1.4 | stable sol |
| Cii | $Zr(O^nPr)_4$ | 15 | 20 | 1.6 | stable sol |
| Di | $Ti(O^iPr)_4$ | 5 | 22 | 1.5 | stable sol |
| Dii | $Ti(O^iPr)_4$ | 10 | 18 | 1.5 | stable sol |
| Diii | $Ti(O^iPr)_4$ | 20 | 12 | 1.5 | stable sol |
| Ei | $Al(O^iPr)_3$ | 5 | 36 | 1.3 | stable sol |
| Eii | $Al(OiPr)_3$ | 10 | 28 | 1.3 | stable sol |
| Eiii | $Al(OiPr)_3$ | 20 | 218 | 1.4 | stable sol |

13) 24.7 g calcium ethoxide together with 0.95 g water-free $MgCl_2$ were suspended in 450 ml ethanol. To this suspension, 50 ml ethanol containing 8 g anhydrous HF (aHF) were added under rigorous stirring. This was followed by an immediate addition of either TEOS $(Si(OEt)_4)$, or TMOS $(Si(OMet)_4)$, or zirconium n-propoxide $(Zr(O^nPr)_4)$, or titanium isopropoxide $(Ti(O^iPr)_4)$, or aluminium isopropoxide $(Al(O^iPr)_3)$. After certain time of stirring at room temperature, clear ethanolic $CaF_2$-sols with an overall alkaline earth metal fluoride content ($CaF_2$ plus $MgF_2$) of 0.4 mol/l was obtained. The concentration of either Si, or, Zr, or Ti, or Al was 5 and 10 mol %, respectively (related to $M^{2+}=Ca^{2+}+Mg^{2+}$). Further increase of the additive concentration did neither improve the sols nor the coatings obtained from these. Hence, they are not listed here. Following this general synthesis procedure, $CaF_2$-sols with different metal additives were obtained as summarized in table 5. The $M^{2+}$-concentration ($M^{2+}=Ca^{2+}+Mg^{2+}$) and the amount of HF (molar HF/M ratio=2.0) and all the other reaction conditions were kept constant.

TABLE 5

In all batches calcium ethylate and $MgCl_2$ together gave 0.2 mol $M^{2+}$ ($Ca^{2+} + Mg^{2+}$) in 450 ml ethanol. In all batches 8 g HF in 50 ml ethanol were used (molar HF/$M^{2+}$ ratio = 2.0).

| No | Additive | Mol % additive | Clear after hours | Viscosity $mm^2s^{-1}$ after 6 weeks | Remarks |
|---|---|---|---|---|---|
| Ai | TEOS | 5 | 26 | 1.3 | stable sol |
| Aii | TEOS | 10 | 24 | 1.4 | stable sol |
| Bi | TMOS | 5 | 20 | 1.3 | stable sol |
| Bii | TMOS | 10 | 18 | 1.3 | stable sol |
| Ci | $Zr(O^nPr)_4$ | 5 | 28 | 1.4 | stable sol |
| Cii | $Zr(O^nPr)_4$ | 10 | 22 | 1.6 | slightly turbid |
| Di | $Ti(O^iPr)_4$ | 5 | 17 | 1.5 | stable sol |
| Dii | $Ti(O^iPr)_4$ | 10 | 16 | 1.5 | stable sol |
| Ei | $Al(O^iPr)_3$ | 5 | 22 | 1.3 | stable sol |
| Eii | $Al(O^iPr)_3$ | 10 | 17 | 1.4 | stable sol |

14) 26.0 g calcium ethoxide were suspended in 450 ml ethanol and then, a certain amount of metal chloride ($MCl_x$, M=$Si^{4+}$, $Zr^{4+}$, $Ti^{4+}$, $Al^{3+}$) additive was added so that the additive concentration was varied between 2.5 to 20 mol % related to the $CaF_2$-concentration. To this suspension, 50 ml ethanol containing 8 g anhydrous HF (aHF) were added under rigorous stirring. After a certain time of stirring at room temperature, clear ethanolic $CaF_2$-sols with a $CaF_2$-content of 0.4 mol/l was obtained. Following this general synthesis procedure, $CaF_2$-sols with different metal additives were obtained as summarized in table 6. The $Ca^{2+}$-concentration and the amount of HF (molar HF/$Ca^{2+}$ ratio=2.0) and all the other reaction conditions were kept constant.

TABLE 6

In all batches calcium ethoxide with a concentration of 0.2 mol in 450 ml ethanol was used. In all batches 8 g HF in 50 ml ethanol were used (molar HF/Ca ratio = 2.0). All samples marked by (*) resulted at higher concentrations either gelled sols or in turbid layers, and hence, are not reflected here.

| No | Additive | Mol % additive | Clear after hours | Viscosity $mm^2s^{-1}$ after 6 weeks | Remarks |
|---|---|---|---|---|---|
| Ai | $SiCl_4$* | 2.5 | 12 | 1.5 | stable sol |
| Aii | $SiCl_4$ | 5 | 10 | 1.4 | stable sol |
| Bi | $ZrCl_4$* | 2.5 | 16 | 1.5 | stable sol |
| Bii | $ZrCl_4$ | 5 | 13 | 1.6 | stable sol |
| Ci | $TiCl_4$* | 2.5 | 13 | 1.4 | stable sol |
| Cii | $TiCl_4$ | 5 | 10 | 1.4 | slightly turbid |
| Di | $AlCl_3$ | 2.5 | 12 | 1.3 | stable sol |
| Dii | $AlCl_3$ | 5 | 10 | 1.3 | stable sol |
| Diii | $AlCl_3$ | 10 | 8 | 1.2 | slightly turbid |

15) 26.0 g calcium ethoxide were suspended in 450 ml ethanol. To this suspension, 50 ml ethanol containing 8 g anhydrous HF (aHF) were added under rigorous stirring. This was followed by an immediate addition of mixture of either TEOS ($Si(OEt)_4$), or TMOS ($Si(OMet)_4$), or zirconium n-propoxide ($Zr(O^nPr)_4$), or titanium isopropoxide ($Ti(O^iPr)_4$), or aluminium isopropoxide ($Al(O^iPr)_3$). After certain time of stirring at room temperature, clear ethanolic $CaF_2$-sols with an overall $CaF_2$ content of 0.4 mol/l were obtained. The concentration of either Si, or, Zr, or Ti, or Al was 5, 10, and 20 mol %, respectively (related to $Ca^{2+}$). Following this general synthesis procedure, $CaF_2$-sols with different metal additives were obtained as summarized in table 7. The $Ca^{2+}$-concentration and the amount of HF (molar HF/M ratio=2.0) and all the other reaction conditions were kept constant.

TABLE 7

In all batches, the calcium ethylate concentration was 0.4 mol/L. In all batches 8 g HF in 50 ml ethanol were used (molar HF/$Ca^{2+}$ ratio = 2.0).

| No | Additive | Mol % additive | Clear (after hours) | Viscosity $mm^2s^{-1}$ (after 6 weeks) | Remarks |
|---|---|---|---|---|---|
| Ai | TEOS/$Zr(O^nPr)_4$ | 2.5/2.5 | 24 | 1.4 | stable sol |
| Aii | TEOS/$Zr(O^nPr)_4$ | 5/5 | 20 | 1.3 | stable sol |
| Bi | TMOS/$Ti(O^iPr)_4$ | 2.5/5 | 17 | 1.3 | stable sol |
| Bii | TMOS/$Ti(O^iPr)_4$ | 5/15 | 12 | 1.3 | stable sol |
| Ci | $Zr(O^nPr)_4$/$Ti(O^iPr)_4$ | 2.5/2.5 | 30 | 1.4 | stable sol |
| Cii | $Zr(O^nPr)_4$/$Ti(O^iPr)_4$ | 5/10 | 14 | 1.4 | stable sol |
| Di | $Ti(O^iPr)_4$ | 5 | 22 | 1.5 | stable sol |
| Dii | $Ti(O^iPr)_4$ | 10 | 18 | 1.5 | stable sol |
| Diii | $Ti(O^iPr)_4$ | 20 | 12 | 1.5 | stable sol |
| Ei | $Al(O^iPr)_3$/$Ti(O^iPr)_4$ | 5/2.5 | 20 | 1.4 | stable sol |
| Eii | $Al(O^iPr)_3$/$Ti(O^iPr)_4$ | 10/5 | 28 | 1.3 | stable sol |
| Eiii | $Al(O^iPr)_3$/$Ti(O^iPr)_4$ | 15/5 | 12 | 1.4 | stable sol |

Formation of $CaF_2$-AR-Layers on Glass Substrates

The general procedure of producing AR-layers based on sols obtained according the procedures described under 1) to 7) followed the following general protocol. Optiwhite glass substrates of 100×150 mm were dip-coated with the respective $CaF_2$-sol. Before dip coating the substrates were cleaned with an alkaline cleaning solution and finally neutralized by washing with de-ionized water. After a drying step at 80° C. for 10 min all samples were finally annealed at 450° C. for 15 min.

Formation of AR-Layers on Polymer Surfaces

The durability of the $CaF_2$ sols obtained according the procedures 1) to 7) of table 8 or examples of table 9 was performed by dip-coating technique. Plates/foils of several polymers (PET, FEP, PES, PC, ETFE, PMMA, PC Lexan, Zeonex, Makrolon, Polycarbonate) were generally first cleaned by treating them with different organic solvents and then either directly coated without any further treatment or Corona pretreated or in some cases, a mediator layer made from either Ormosil® or Silazanes was first deposited in order to improve the grafting properties.

Characterization of the $CaF_2$-Sols

The hydrodynamic diameter of the nano particles was determined by dynamic light scattering (DLS) measurements using a Zetasizer Nano ZS (Malvern Instruments, Worcestershire, UK) using quartz cuvettes flushed with an argon atmosphere. The viscosity was determined simultaneous to DLS measurements with a microviscometer from Anton Paar (AMVn; Graz, Austria) at 25° C. Hydrodynamic diameter were calculated by deconvolution of the correlation functions into exponential functions using non-negatively constrained least squares (NNLS) fitting algorithm as implemented in the Malvern Nanosizer software. The zeta potential was determined from the electrophoretic mobilities of the particles in the sol using the Smoluchowski relation.

Characterization of the $CaF_2$-AR-Layers

The refractive indices and the optical transmission and reflectance, respectively, were determined by ellipsometric measurements with a variable angle UV-Vis spectroscopic ellipsometer SE850 of the company SENTECH Instruments GmbH in the wavelength range between 350 nm and 1000 nm. For the evaluation and fitting of the refraction indices n and the absorption k were used the data set in the visible range (350-800 nm) using the CAUCHY model. The reported refractive indices were taken at a wavelength of 589 nm.

The mechanical stability of the AR-layers was tested with a crockmeter (Linartester 249) from ERICHSEN GmbH & Co KG, Germany. As an example, the scratch resistance of a $CaF_2$-layer obtained from a sol prepared according synthesis procedure 3) was determined. The layer remained un-affected after 100 passes with a felt tester or after 100 passes by a steel wool tester. $^{19}F$ MAS NMR spectra were recorded on a Bruker Avance 400. The chemical shifts of the nuclei are given with respect to $CFCl_3$ for $^{19}F$. XRD measurements were performed with the FPM7 equipment (Rich. Seiffert & Co., Freiberg) with Cu Kα (Cu Kα1.2, λ=1.542 Å) radiation (2Θ range: 5°≤2Θ≤64°).

All the sols described under 1) to 7) gave AR-layers which do not differ remarkably from each other based on simple eye inspection. The characteristic data of the $CaF_2$—Ar-layers made are summarized in Table 8.

TABLE 8 summarizes the main characteristics of Ar layers on Optiwhite glass

| | Sol | | | Layer | |
|---|---|---|---|---|---|
| | Compos. | Viscosity | Particle-Ø | | |
| Synth. | mol % | mm$^2$ s$^{-1}$ | [nm] | n | Crockmeter |
| 1 | 100% CaF$_2$ | 1.4 | 12-16 | 1.25 | no scratch |
| 2 | 100% CaF$_2$ | 1.6 | 10-14 | 1.22 | no scratch |
| 3 | 90% CaF$_2$ 10% TEOS | 1.4-1.7 | 8-11 | 1.23 | no scratch |
| 4 | 90 CaF$_2$/10 MgF$_2$ | 1.6 | 7-10 | 1.25 | no scratch |
| 5 | 90 CaF$_2$/10 AlF$_3$ | 1.5-1.7 | 10-16 | 1.18 | little scratch |
| 7 | 90 CaF$_2$/10 MgF$_2$ | 1.5 | 7-12 | 1.26 | no scratch |

The crockmeter test is a normalized method probing the scratch resistance of a coated layer. For this, a planar coated substrate (100×150 mm) is fixed inside a commercial crockmeter and then subjected to a defined number of abrasion cycles (up to 500).

Table 9 summarizes the main characteristics of Ar layers on Optiwhite glass with a higher number of abrasion cycles. All the sols described under 1) to 15) gave AR-layers which do not differ remarkably from each other based on simple eye inspection. The characteristic data of the CaF$_2$—Ar-layers made are summarized in Table 9. In the Crockmeter test was a felt rubber used.

TABLE 9

| | Sol | | | Layer | | |
|---|---|---|---|---|---|---|
| | Compos. | Viscosity | Particle- | | | |
| Synth. | mol % | mm$^2$ s$^{-1}$ | Ø [nm] | N | Crockmeter | XRD |
| 1 | 100% CaF$_2$ | 1.4 | 12-16 | 1.25 | layer completl. removed | weak CaF$_2$ reflexes |
| 2 | 100% CaF$_2$ | 1.6 | 10-14 | 1.26 | layer completl. removed | weak CaF$_2$ reflexes |
| 3 | 90% CaF$_2$ 10% TEOS | 1.4-1.7 | 8-11 | 1.28 | layer completl. removed | only CaF$_2$ |
| 4 | 90CaF$_2$/10MgF$_2$ | 1.6 | 7-10 | 1.25 | some scratches | only CaF$_2$, 1.4% Cl$^-$ |
| 5 | 90CaF$_2$/10AlF$_3$ | 1.5-1.7 | 10-16 | 1.18 | some scratches | only CaF$_2$ |
| 7 | 90CaF$_2$/10MgF$_2$ | 1.5 | 7-12 | 1.26 | some scratch | only CaF$_2$ |
| 8 | 100% CaF$_2$ | 1.5 | 8-12 | 1.27 | some scratch | only CaF$_2$ |
| 9A | 100 CaF$_2$ | 1.4 | 8-12 | 1.27 | no scratch | only CaF$_2$, 1.4% Cl$^-$ |
| 9B | 100 CaF$_2$ | 1.4 | 8-12 | 1.26 | no scratch | only CaF$_2$, 1.8% Cl$^-$ |
| 9C | 100 CaF$_2$ | 1.4 | 8-12 | 1.26 | little scratch | CaF$_2$, 2.1.% Cl$^-$ |
| 9D | 100 CaF$_2$ | 1.4 | 8-12 | 1.25 | traces | CaF$_2$, 2.5% Cl$^-$ |
| 10B | 100 CaF$_2$ | 1.5 | 10-16 | 1.29 | more scratches | only CaF$_2$, 1.6% Cl$^-$ |
| 11A | 95 CaF$_2$/5MgF$_2$ | 1.4 | 7-12 | 1.30 | no scratch | only CaF$_2$, 1.0% Cl$^-$ |
| 11B | 90CaF$_2$/10MgF$_2$ | 1.4 | 8-12 | 1.28 | no scratch | only CaF$_2$, 1.4% Cl$^-$ |
| 11C | 80CaF$_2$/20MgF$_2$ | 1.3 | 8-14 | 1.27 | traces | only CaF$_2$, 1.7% Cl$^-$ |
| 13Ai | 95CaF$_2$/5MgF$_2$ 5% Si(OEt)$_4$ | 1.4 | 9-15 | 1.28 | no scratch | only CaF$_2$, 0.9% Cl$^-$ |
| 13Ci | 95CaF$_2$/5MgF$_2$ 5% Zr(O$^n$Pr)$_4$ | 1.3 | 8-14 | 1.29 | traces | only CaF$_2$, 1.0% Cl$^-$ |
| 13Di | 95CaF$_2$/5MgF$_2$ 5% Ti(O$^i$Pr)$_4$ | 1.4 | 8-12 | 1.28 | no scratch | only CaF$_2$, 0.9% Cl$^-$ |
| 13Ei | 95CaF$_2$/5MgF$_2$ 5% Al(O$^i$Pr)$_3$ | 1.2 | 7-11 | 1.27 | no scratch | only CaF$_2$, 1.0% Cl$^-$ |

Concerning 9A to 9D or 10B even if 100 CaF$_2$ is used as an identification, the "CaClF" species is present in the surface coating (indicated by the amount of Cl in the surface shown in table 9), however, a quantitative assignment of this species was not possible. The above mentioned surface coatings are only examples.

Other metal additive provide similar good results. For example surface coatings comprising additives derived from 12) such as AlCl$_3$, Al(O$^i$Pr)$_3$ or Ti(O$^i$Pr)$_4$ show no scratches (AlCl$_3$) or few scratches (Al(O$^i$Pr)$_3$ or Ti(O$^i$Pr)$_4$). Furthermore, for example surface coatings comprising additives derived from 14) show just traces of scratches.

The crockmeter test is a normalized method probing the scratch resistance of a coated layer. For this, a planar coated substrate (100×150 mm) is fixed inside a commercial crockmeter and then subjected to a defined number of abrasion cycles (up to 1000). Chloride (Cl$^-$) content was determined by elemental analysis and is given in mass %.

The invention claimed is:

1. A method for obtaining a calcium fluoride (CaF$_2$) sol solution, comprising the steps of
    a) providing calcium in a first volume, in a non-aqueous solvent, in the form of a calcium precursor,
    b) adding, in a second volume, 1.85 to 2.05 molar equivalents of anhydrous hydrogen fluoride (HF) per mole calcium precursor to said first volume, and
    c) adding, a metal additive before or after step b), wherein said metal additive is selected from
the group consisting of lithium, calcium, strontium, barium, aluminium, silicium, zirconium, titanium, antimony, tin and zinc, whereby the amount of said metal additive precursor, in relation to the amount of said calcium precursor is 1:100 to 1:5, as measured in molar equivalent of said metal additive to said calcium precursor, wherein
an additional amount of hydrogen fluoride ($n_{adHF}$) is present in the fluorination of step b computed according to the formula $$n_{adHF}^{Ca}=(n_M * \chi_{additive})*Ox*A, \text{ wherein}$$

$n_M$ is the molar amount of said calcium precursor,
$\chi_{additive}$ is the molar percentage of said metal additive precursor in relation to said molar amount of said calcium precursor wherein
$\chi_{additive}$ is in the range of 1% to 20%, and
Ox is the oxidation state of the metal of said additive precursor, and
A is selected from $0 \leq A \leq 1$.

2. The method according to claim 1, characterized in that the water content of the sol solution is equal to or lower than 2.8 molar equivalents in relation to the sum of calcium and magnesium.

3. The method according to claim 1, wherein said calcium precursor is selected from the group consisting of a calcium alcoholate (RO—), a calcium carboxylate (RCOO—), an calcium alkoxycarbonate, calcium hydroxide, calcium nitrate and calcium halides selected from chloride, bromide and iodide.

4. The method according to claim 1, wherein said non-aqueous solvent is an alcohol, a polyalcohol, an ether, an ester, or a mixture thereof.

5. The method according to claim 1, wherein said metal additive precursor comprises at least two metals of the group consisting of lithium, calcium, antimony, tin, strontium, barium, aluminium, silicium, zirconium, titanium and zinc.

6. The method according to claim 1, wherein said metal additive precursor is added after step b.

7. The method according to claim 1, wherein said metal additive precursor is selected from the group consisting of alcoholates (RO—), carboxylates (RCOO—), carbonates, alkoxycarbonates, hydroxides, nitrates, chlorides, bromides and iodides.

8. The method according to claim 1, wherein said metal additive is selected from the group consisting of $CaCl_2$, $MgCl_2$, LiCl, $C_8H_{20}O_4Si$, $Zr(O''Pr)_4$, $Ti(O^iPr)_4$, $Al(O^iPr)_3$, $Sb(OAc)_3$, $AlCl_3$ and $Sn(OAc)_2$; and wherein $O''Pr$ is 1-propyl and $O^iPr$ is isopropyl.

9. The method according to claim 3, wherein said calcium precursor is selected from the group consisting of calcium thanolate and calcium chloride.

10. A method for obtaining a calcium fluoride ($CaF_2$) sol solution, comprising the steps of
a) providing calcium in a first volume, in a non-aqueous solvent, in the form of a calcium precursor,
b) adding, in a second volume, 1.85 to 2.05 molar equivalents of anhydrous hydrogen fluoride (HF) per mole calcium precursor to said first volume, and
c) adding, a metal additive before, during or after step b), wherein said metal additive is selected from
magnesium, in the form of a magnesium precursor, wherein
the amount of magnesium, in relation to the amount of calcium, is selected from 1:100 to 1:1 as measured in molar equivalent of magnesium to calcium, and wherein
1.85 to 2.05 molar equivalents of anhydrous hydrogen fluoride ($n_{HFc}$) per mole magnesium are present in said second volume, in addition to the HF present in said second volume per mole calcium.

11. The method according to claim 10, wherein said magnesium precursor is selected from the group consisting of a magnesium alcoholate (RO—), a magnesium carboxylate (RCOO—), an magnesium alkoxycarbonate, magnesium carbonate, magnesium nitrate, and a magnesium halide selected from chloride, bromide, and iodide.

12. The method according to claim 11, wherein said magnesium precursor is selected from the group consisting of magnesium chloride, and magnesium ethanolate.

13. The method according to claim 10, characterized in that the water content of the sol solution is equal to or lower than 2.8 molar equivalents in relation to the sum of calcium and magnesium.

14. The method according to claim 10, wherein said calcium precursor is selected from the group consisting of a calcium alcoholate (RO—), a calcium carboxylate (RCOO—), an calcium alkoxycarbonate, calcium hydroxide, calcium nitrate, and calcium halides selected from chloride, bromide, and iodide.

15. A method for obtaining a calcium fluoride ($CaF_2$) sol solution, comprising the steps of
a) providing calcium in a first volume, in a non-aqueous solvent, in the form of a calcium precursor,
b) adding, in a second volume, 1.85 to 2.05 molar equivalents of anhydrous hydrogen fluoride (HF) per mole calcium precursor to said first volume, and
c) adding, a metal additive before, during or after step b), wherein said metal additive is selected from
i) magnesium, in the form of a magnesium precursor, wherein
the amount of magnesium, in relation to the amount of calcium, is selected from 1:100 to 1:1 as measured in molar equivalent of magnesium to calcium, and wherein
1.85 to 2.05 molar equivalents of anhydrous hydrogen fluoride ($n_{HFc}$) per mole magnesium are present in said second volume, in addition to the HF present in said second volume per mole calcium,
and
ii) a metal additive, selected from the group consisting of lithium, calcium, antimony, tin, strontium, barium, aluminium, silicium, zirconium, titanium and zinc, in the form of a metal additive precursor, wherein
the amount of said metal additive precursor, in relation to the sum of the amount of calcium and magnesium, is selected from 1:100 to 1:5, as measured in molar equivalents of said metal additive to the sum of calcium and magnesium, and wherein
an additional amount of hydrogen fluoride ($n_{adHF}$) is present in step b computed according to the formula $$n_{adHF}^{MgCa}=(n_M * \chi_{additive})*Ox*A, \text{ wherein}$$

$n_M$ is sum of the molar amounts of calcium and magnesium,
$\chi_{additive}$ is the molar percentage of said metal additive in relation to $n_M$,
$\chi_{additive}$ is in the range of 1% to 20%,
Ox is the number characterizing the oxidation state of said metal additive, and
A is selected from $0 \leq A \leq 1$.

16. The method according to claim 15, wherein said magnesium precursor is selected from the group consisting of a magnesium alcoholate (RO—), a magnesium carboxylate (RCOO—), an magnesium alkoxycarbonate, magnesium carbonate, magnesium nitrate, and a magnesium halide selected from chloride, bromide, and iodide.

17. The method according to claim 16, wherein said magnesium precursor is selected from the group consisting of magnesium chloride, and magnesium ethanolate.

18. The method according to claim 15, characterized in that the water content of the sol solution is equal to or lower than 2.8 molar equivalents in relation to the sum of calcium and magnesium.

19. The method according to claim 15, wherein said calcium precursor is selected from the group consisting of a calcium alcoholate (RO—), a calcium carboxylate (RCOO—), an calcium alkoxycarbonate, calcium hydroxide, calcium nitrate, and calcium halides selected from chloride, bromide, and iodide.

20. The method according to claim 19, wherein said calcium precursor is selected from the group consisting of calcium thanolate, and calcium chloride.

\* \* \* \* \*